(12) United States Patent
Andreev et al.

(10) Patent No.: US 12,450,414 B2
(45) Date of Patent: Oct. 21, 2025

(54) SYSTEMS AND METHODS FOR GENERATING PLACEMENTS FOR CIRCUIT DESIGNS USING PYRAMIDAL FLOWS

(71) Applicant: Intel Corporation, Santa Clara, CA (US)

(72) Inventors: Alexander Andreev, San Jose, CA (US); Alexander Rusakov, Moscow (RU); Alexander Yakhontov, Moscow (RU)

(73) Assignee: Altera Corporation, San Jose, CA (US)

( * ) Notice: Subject to any disclaimer, the term of this patent is extended or adjusted under 35 U.S.C. 154(b) by 793 days.

(21) Appl. No.: 17/556,911

(22) Filed: Dec. 20, 2021

(65) Prior Publication Data

US 2022/0114321 A1   Apr. 14, 2022

(51) Int. Cl.
*G06F 30/392* (2020.01)
*G06F 111/04* (2020.01)

(52) U.S. Cl.
CPC ........ *G06F 30/392* (2020.01); *G06F 2111/04* (2020.01)

(58) Field of Classification Search
CPC ............... G06F 16/955; G06F 16/9566; G06F 16/9574; G06F 16/958; G06F 9/455; G06F 40/35; G06F 2111/04; G06F 30/392; G06F 30/30; G06F 16/29; G06F 30/00; G06F 2111/02; G06F 18/214; G06F 3/016; G06F 3/04815; G06F 16/587; G06N 3/0464; G06N 5/02
USPC ................................................ 716/118–125
See application file for complete search history.

(56) References Cited

U.S. PATENT DOCUMENTS 9,652,576 B2    5/2017  Mihal et al.
10,050,904 B2 *  8/2018  Konda ................. G06F 30/347
10,536,399 B2 *  1/2020  Konda ................. H04L 49/101

OTHER PUBLICATIONS

Ulrich Brenner et al., "Faster and Better Global Placement by a New Transportation Algorithm," DAC 2005, Jun. 13-17, 2005, pp. 591-596.
Balazs Dezso et al., "Lemon—An open source C++ graph template library," Electronic Notes in Theoretical Computer Science, 264:23-45, Proc. 2nd Workshop on Generative Technologies, Jul. 2011, pp. 1-11.

(Continued)

*Primary Examiner* — Binh C Tat
(74) *Attorney, Agent, or Firm* — InventIQ Legal LLP; Steven J. Cahill

(57) ABSTRACT

A circuit design system is configured to generate a circuit design for an integrated circuit. The circuit design system includes a placement tool configured to generate a graph comprising flows between objects in a first level of a pyramid and targets in the first level. The placement tool generates clusters of objects in a second level of the pyramid in each of the objects in the first level. The objects in the first and the second levels comprise circuit blocks in the circuit design. The placement tool generates clusters of targets in the second level of the pyramid in each of the targets in the first level. The targets in the first and the second levels include subregions of the integrated circuit. The placement tool generates flows from the objects in the second level to the targets in the second level for a placement of the circuit blocks.

20 Claims, 17 Drawing Sheets

(56) References Cited

OTHER PUBLICATIONS

Nima Darav et al., "Multi-Commodity Flow-Based Spreading in a Commercial Analytic Placer," Proceedings of the 2019 ACM/SIGDA International Symposium on Field-Programmable Gate Arrays (FPGA '19), Feb. 24-26, 2019, pp. 122-131.

* cited by examiner

SYSTEMS AND METHODS FOR GENERATING PLACEMENTS FOR CIRCUIT DESIGNS USING PYRAMIDAL FLOWS

FIELD OF THE DISCLOSURE

The present disclosure relates to electronic circuit design, and more particularly, to systems and methods for generating placements for circuit designs for integrated circuits using flows in multi-level pyramids.

BACKGROUND

A field programmable gate array (FPGA) is a type of integrated circuit (IC) that includes programmable interconnects and programmable logic blocks. The interconnects and logic blocks are programmable after fabrication in an FPGA. In an application specific integrated circuit (ASIC), the logic circuitry and interconnects typically have substantially less configurable features after fabrication than an FPGA. In general, an ASIC can implement a larger circuit design than an FPGA, because an ASIC is designed to use IC die area more efficiently, but ASIC design flow is often more expensive and complex than configuring an FPGA. A structured application specific integrated circuit (ASIC) has intermediate features between a standard ASIC and an FPGA. A structured ASIC may have the same basic logic structure as an FPGA, while being mask-programmable instead of field-programmable, by configuring vias between metal layers in the integrated circuit. Each configuration bit in an FPGA can be replaced in a structured ASIC by either placing or not placing a via between metal contacts.

DETAILED DESCRIPTION

Figure 1:
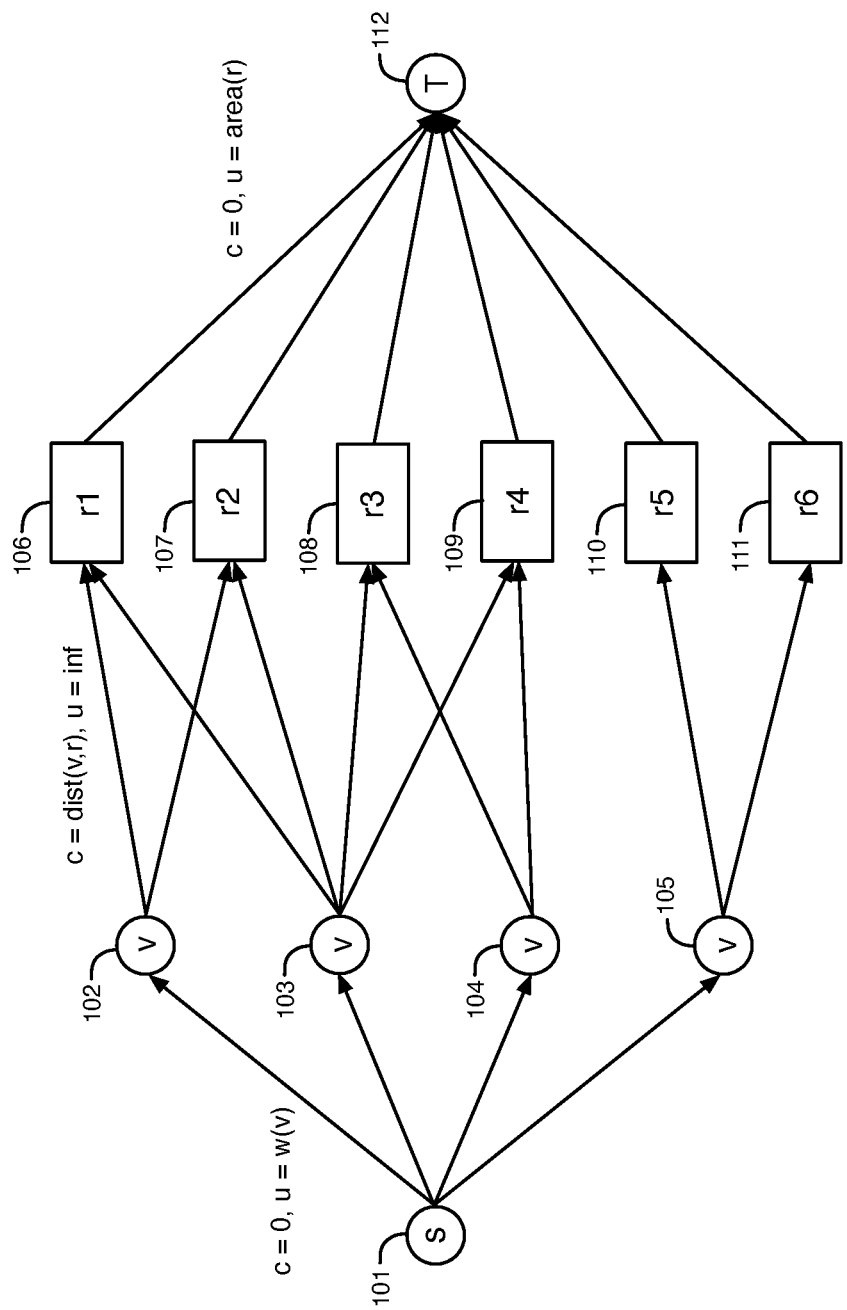
FIG. 1 is a diagram illustrating an example of a network graph G that corresponds to a formulation for a transportation problem for placement legalization in an integrated circuit (IC) device.

One or more specific examples are described below. In an effort to provide a concise description of these examples, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Placement is a part of the physical design of very large scale integration (VLSI) integrated circuit (IC) devices. Circuit designs for IC devices have millions of circuits that have to be placed in a given area. These circuits are connected by interconnect. The design process for an IC efficiently determines a placement for blocks (i.e., groups) of the circuits that minimizes the total interconnect length and that allows for routing and timing optimization. Placement may be divided into global placement and legalization. Global placement involves spreading the blocks of circuits (i.e., circuit blocks) over the IC die area without meeting all constraints of the IC device. Legalization placement involves moving the circuit blocks to their final positions while satisfying all constraints of the IC device.

Efficient VLSI placement methods for integrated circuit (IC) devices, such as FPGA and structured ASIC devices, use algorithms for the assignment and legalization of circuit blocks that are efficient and optimal. The assignment or legalization algorithms receive input circuit block positions from netlists and reassign the circuit blocks to legal positions in an IC device that satisfies all of the constraints. These constraints, for example, may include density constraints, floorplan constrains, and clock constraints. A placement is optimal if the sum of circuit block displacements from their initial positions to the legal positions is minimal. Often, the optimal netlist assignment or legalization problem is formulated as a minimal cost maximum flow problem.

Some approaches for the circuit block legalization problem use geometric sorting based methods. Geometric sorting based methods are fast but are not accurate. Cumulative error affects the quality of the results (QoR). In addition, some types of constraints cannot be preserved using geometric sorting. Flat graph-based approaches for VLSI circuit legalization have also been used. Existing approaches for the solution of either the minimal cost maximum flow problem or for the special cases of transportation problems are formulated for a complete flat graph. Flat graph-based approaches may be accurate, but are slow for large dimensional problems. Also, these algorithms are runtime expensive in the iterative optimization processes.

The transportation problem is a special case of a minimal cost maximum flow problem with the property that the node set N is partitioned into two subsets $N_1$ and $N_2$ (of possibly unequal cardinality) so that (1) each node in $N_1$ is a supply node, (2) each node $N_2$ is a demand node, and (3) for each arc (i, j) in A, $i \in N_1$ and $j \in N_2$. In the transportation problem, there are two sets of graph vertexes: objects and targets. The edges (arcs) in the graph are only between targets and objects. S and T nodes can be used for one of the classical variant definitions of the problem. Arcs from S to objects denote object areas. Arcs from targets to T denote target capacity (area).

According to some examples disclosed herein, systems and methods are provided for the legal placement of circuit blocks in an integrated circuit (IC) device. The systems and methods convert an input physical placement of the circuit blocks that has violated density or floorplan constraints of the IC into a legal circuit block placement. In the legal circuit block placement, the sum of the displacements of the circuit blocks relative to the original placement is close to the minimum, but the density and the floorplan constraints of the IC are satisfied. The systems and methods use a pyramidal network flow algorithm for the solution of a minimal cost assignment problem on a two-dimensional space. These systems and methods can be used to generate a solution to a very large circuit placement legalization and assignment problem. The pyramidal network flow algorithm can provide a fast solution for the legalization and assignment problem for circuit blocks having large dimensions. The systems and methods use information about the geometrical proximity of the minimal cost maximum flow network graph elements to construct hierarchical representations (e.g., in a pyramid) and to reduce a large original problem to a set of smaller size sub-problems. The pyramidal network flow algorithm has a superior accuracy in comparison to fast approximate legalization or assignment methods. The pyramidal network flow algorithm also achieves a significant speed-up over other methods and algorithms for the solution of the exact assignment (transportation) problem without a significant compromise in cost functional value. Also, the pyramidal network flow algorithm may be highly parallelized. These systems and methods are based on the network flow formulation of the transportation problem of the density legalization problem.

According to some specific examples disclosed herein, a pyramidal assignment algorithm is provided for solving a transportation problem arising in a structured ASIC physical synthesis flow. It is assumed that all circuit instances in an assignment problem are of the same resource type. If $v_i$ is a node of a hypergraph, i=1, |V|, then for each node of the hypergraph, the area is defined as $w(v_i)$. Each site in the IC device is assigned to an area of 1.0. The area grid of the IC device is split into small subareas, referred to as targets $r_j$, with each subarea containing approximately 20-50 physical sites. A capacity of a subarea (target) $r_j$ is denoted as $cap(r_j)$. Any target $r_j$ contains sites in the IC device of a certain type.

To formulate a minimum displacement circuit block legalization problem as a network flow problem, a network graph G is provided that has a vertex set: $(v_i \cup r_j \cup \{s,t\})$, where s,t are dummy source and target nodes. An edge set for the network graph G is defined as E(G) $(\{v_i \times r_j\} \cup \{s \times v_i\} \cup \{t \times r_j\})$. Edge capacities for the network graph G are defined as $u(v_i, r_j)$=infinity; $u(r, t)$=$cap(r_j)$; $u(s, v_i)$=$w(v_i)$. Edge costs for the edges of the network graph G are defined as $cost(v_i, r_j)$=$distance(v_i, r_j)$; $cost(r_j, t)$=$cost(s,v_i)$=0. The edge between node $v_i$ and target $r_j$ exists only if the node circuit type k allows placement onto the site of target $r_j$. The targets $r_j$ correspond to subregions of the IC device. The task is to find a minimum cost feasible flow on each edge: f(e).

In the transportation problem described above, $v_i$ are objects to be assigned on targets $r_j$. Edges that originate on objects connect the objects to all of the targets where the objects can be placed in the IC. The network graph G may also contain edges connecting dummy target nodes t and targets $r_j$. The network graph G may further contain edges that connect dummy source nodes s and objects. The result of the solution of the transportation problem is flows on each edge of the network graph G.

FIG. 1 is a diagram illustrating an example of a network graph G that corresponds to a formulation for a transportation problem for placement legalization in an integrated circuit (IC) device. The network graph G of Figure (FIG. 1 includes a source 101, vertices 102-105, subregions 106-111, target 112, and edges that are indicated by the arrows in FIG. 1. Each of the vertices 102-105 of the graph G corresponds to instances of a netlist for a circuit design for the integrated circuit (IC). The subregions (r1-r6) 106-111 are physical positions or resources of circuits in the IC device. The cost c of the edges and the edge capacities u are indicated in FIG. 1. Source S 101 is a dummy source vertex, and the target T 112 is a dummy target vertex. The edge capacity u of each of the edges from subregions 106-111 to dummy target 112 equals the device subregion areas. The edge capacity u of each of the edges from dummy source 101 to vertices 102-105 is w(v). The edge capacity of each of the edges from vertices 102-105 to subregions 106-111 is infinity.

The floorplan region constraints of the IC device are supported in the network flow formulations disclosed herein. If $v_i$ cannot be placed in subregion $r_i$, edge $e(v_i, r_j)$ can be excluded from the network graph G. In some examples disclosed herein, region constrains may not be considered in the algorithm description to simplify the notation. The standard flat formulation of the minimum displacement assignment problem may provide a solution, but the runtime of the flat algorithm mentioned above may not satisfy system requirements. In addition, the flat formulation may be difficult to implement for parallelization.

According to some examples disclosed herein, systems and methods for pyramidal legalization placement in an IC device are implemented for a hierarchical transportation problem. The natural structure hierarchy of the IC device is used for the construction of objects and targets in a multi-level pyramid. At each level of the pyramid, a set of minimum cost maximum flow tasks are built. An algorithm for pyramidal legalization placement is provided that solves hierarchical transportation problems using the hierarchy of the pyramid. The hierarchical transportation problems involve how to apply the results obtained on the top levels of the pyramid to lower levels of the pyramid. The size of each problem is limited by a constant that is independent of the netlist size. As a result, the complexity of the legalization task is reduced, and the algorithm can be parallelized. The pyramid may have any number of 2 or more levels, for example, 2 levels, 3 levels, 4 levels, 5 levels, 6 levels, 7 levels, 8 levels, etc.

The algorithm for pyramidal legalization placement in the pyramid receives as an input a set of objects and targets. For the objects and targets, a distance function is defined. In a clustering stage, the algorithm constructs levels of the objects and targets in the pyramid. In each level L of the pyramid, multiple geometrically close targets of the next lower level L−1 are clustered together. The capacity of each cluster equals the sum of the capacity of the target children on level L−1. Also, in each level L of the pyramid, a number of close objects in level L−1 are clustered into a cluster having an area equal to the sum of the areas of the objects. This process continues until the number of objects and targets on the level reaches a predefined limit. After the pyramid of objects and targets is constructed, the transportation problem is solved. Resulting flows from objects to targets on the top level L of the pyramid are obtained. The targets may, for example, be defined as subregions on the grid of the IC device. To propagate the solution of the transportation problem to the level L−1 of the pyramid, the algorithm for pyramidal legalization placement performs a procedure that includes object split, target split, and level optimization sub-procedures, which are disclosed in further detail herein with respect to FIGS. 2A-4B.

The solution of the minimal cost maximum flow problem provides flows that are a solution of the placement legalization problem of physical circuit blocks in an IC device. The solution of the minimal cost maximum flow problem minimizes the Total Cost of the feasible maximum flow through the network graph, as shown in equation (1).

$$\text{Minimize Total Cost}(f(e_i)) = \Sigma_{e_i} \text{cost}(e_i) * f(e_i), i=1, \ldots |E| \quad (1)$$

In equation (1), $e_i$ is the $i^{th}$ edge in the network graph of the transportation problem, $\text{cost}(e_i)$ is the cost of the edge, $f(e_i)$ is the flow through the edge e, and $|E|$ is the number of the edges in the network graph. In the example of the circuit legalization placement in an IC device, the $\text{cost}(e_i)$ may be the Manhattan distance (or the Euclidian distance) between an object and a target connected by an edge, $f(e_i)$ is the number of circuit blocks in a circuit design for an IC device that should be moved from the clustered object to a target, and the Total Cost is the sum of the circuit block displacements from their input positions to legal placement positions. Edges e in the network graph connect objects (i.e., circuit blocks in a circuit design for the IC device) and targets (i.e., subareas on the IC device). The flows must satisfy a set of constraints, including that a) the flows are non-negative; b) the sum of the flows from any object equals the object areas; c) the sum of the flows to any target does not exceed the target capacity (available area). The minimal cost maximum flow for circuit legalization problem formulated above is also known as the transportation problem. In terms of the transportation problem, the task is to transport (i.e., move) all objects (i.e., circuit blocks) to their new positions (i.e., targets) in a placement such that the sum of the displacements (i.e., total cost) is minimized.

The solution of equation (1) must satisfy the following three constraints:

$$0 \leq f(e_i) \leq u(e_i), \forall e_i \in E(G) \quad (2)$$

$$f(e_{si}) = u(e_{si}), \forall e_{si} \text{ starting on } s \quad (3)$$

$$\Sigma_{e_{jk} \in E(k)} f(e_{jk}) = \Sigma_{e_{kl} \in E(k)} f(e_{kl}), k \in \{v_i\} \cup \{r_i\} \quad (4)$$

The constraint (2) denotes that edge flow is positive and cannot exceed edge capacity value. The physical meaning of the constraint (2) is that a limited number of circuit blocks can be placed into any target. Constraint (3) ensures that maximum flow originating from the dummy vertex s is achieved. The physical meaning of constraint (3) is that all circuit blocks are assigned to some target vertex. The constraint (4) ensures flow conservation for all vertices of network graph G, except dummy s and t vertices, such that the sum of incoming flows is equal to the sum of outgoing flows. E(k) is the edges incident to node k of the network graph G. The network graph G is a bipartite graph. The minimal cost maximum flow problem of equation (1) and constraints (2)-(4) corresponds to the transportation problem.

The placement legalization problem (i.e., the assignment problem) can be formulated as follows. For given positions of instances in a placement of a netlist of a circuit design for an IC device, find positions such that the placement density in each of the core subregions of the IC device is satisfied, and the sum of the instance displacements is minimal. The algorithm for placement legalization may, for example, include 3 stages. In the first stage of the algorithm, a corresponding minimal cost maximum network flow problem is formulated, as disclosed herein, for example, with respect to the network graph of FIG. 1. The algorithm for pyramidal legalization placement receives as an input a set of objects, corresponding targets, and edges with costs and capacities. Edge flow values are calculated for the edges. The edge flow values provide a solution to the assignment problem. In the first stage, a pyramid is constructed that has circuit blocks (i.e., objects) and subregions of the IC device (i.e., targets). The pyramid is built by clustering objects and targets into clusters that are geometrically close in the IC. A hierarchy is constructed in the pyramid of the clusters of objects and targets using information about geometrical distances of circuits in the IC device. The lowest level of the pyramid corresponds to the original transportation problem (e.g., with circuit blocks in a circuit design for an IC). The topmost level of the pyramid corresponds to a small dimensional transportation problem with a few objects and a few targets. Thus, a small size top-level minimal cost maximum flow task is constructed and solved.

In the second stage of the algorithm, a solution of the topmost level of the pyramid is obtained using any algorithm for a solution of the transportation problem. As an example, a solution of the topmost level of the pyramid may be obtained using a cycle cancelling algorithm.

In the third stage of the algorithm, a solution (e.g., a flow) from the top level of the pyramid is propagated to the lowest level in the hierarchy of the pyramid. In the third stage, the algorithm provides a flow propagation from the top level of the pyramid to the lowest level of the pyramid. The algorithm receives a network graph as an input that has known flows, corresponding to the transportation problem, on the selected hierarchy level L of the pyramid. The algorithm generates as an output a solution (e.g., flows) of the transportation problem on the hierarchy level L−1 of the pyramid. Objects on level L−1 are subclusters of the objects on level L. Targets on level L−1 are subclusters of the targets on level L. The propagation of the algorithm provides solutions to many small-size subproblems. The resulting solution (e.g., flows on edges) of the algorithm is an approximated solution of the transportation problem on the level L−1. The resulting flows of the algorithm provide a solution of the original circuit legalization problem for placement. As a result, an approximated solution of the original high dimensional transportation problem is obtained. In the third stage, the edge flow values computed in the first stage from level L are used to assign flows to the edges of the lower level L−1 of the pyramid using a procedure having three sub-procedures. The three sub-procedures are object split, target split, and level optimization. The third stage may be iterative.

During the object split sub-procedure, a precomputed flow is propagated from a solution on the level L of the pyramid to a partially unclustered network graph. The partially unclustered network graph contains targets corresponding to level L and objects corresponding to level L−1. In other words, objects are substituted with clusters of objects. For each object cluster, an auxiliary transportation problem I is formulated and solved. Auxiliary problem objects are flows from a cluster. Auxiliary targets are original problem clusters. The cost that is assigned for each edge in an auxiliary task is the distance between clusters on the level L−1 to targets on the level L.

In order to propagate the solution to the transportation problem to the level L−1 of the pyramid, the algorithm for pyramidal legalization placement performs the procedure including the object split, target split, and level optimization sub-procedures. The object split, target split, and level optimization sub-procedures are described below with respect to FIGS. 2A-2C, 3A-3C, and 4A-4B, respectively.

Figure 2A:
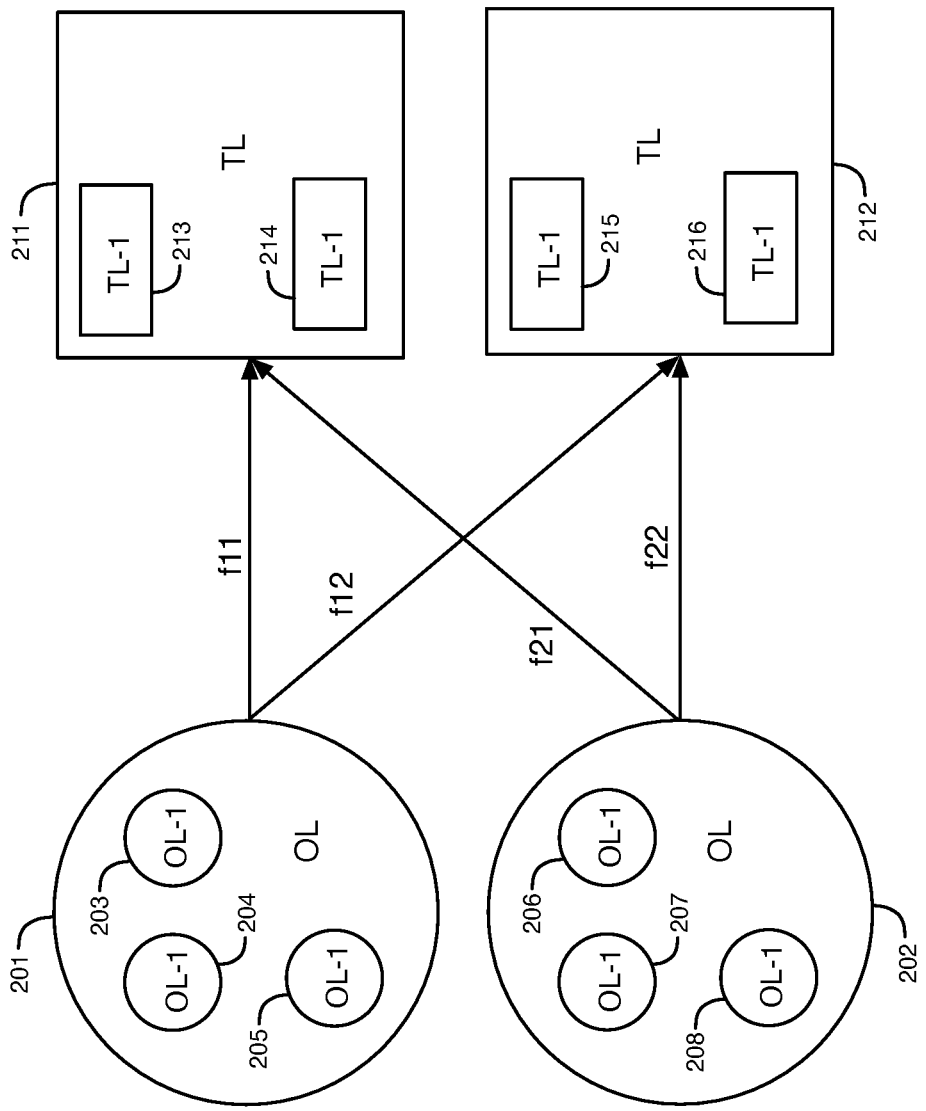
FIG. 2A is a diagram that illustrates flows from objects OL on top level L to targets TL on top level L in a pyramid during an object split sub-procedure.
Figure 2B:
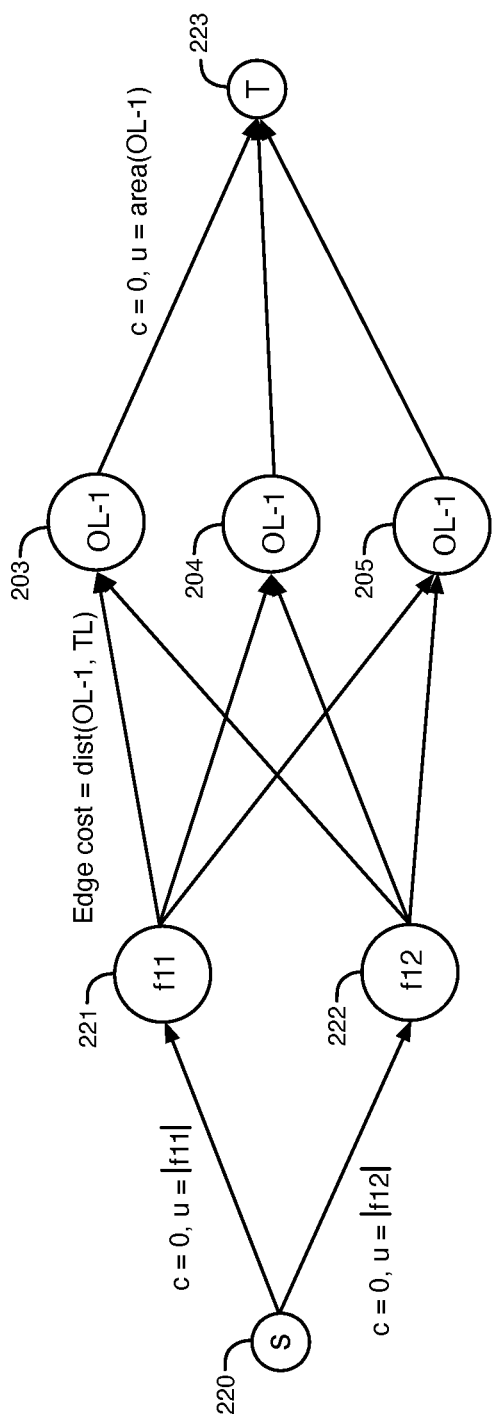
FIG. 2B is a diagram that illustrates a formulation of the auxiliary transportation problem I for two of the flows shown in FIG. 2A.
Figure 2C:
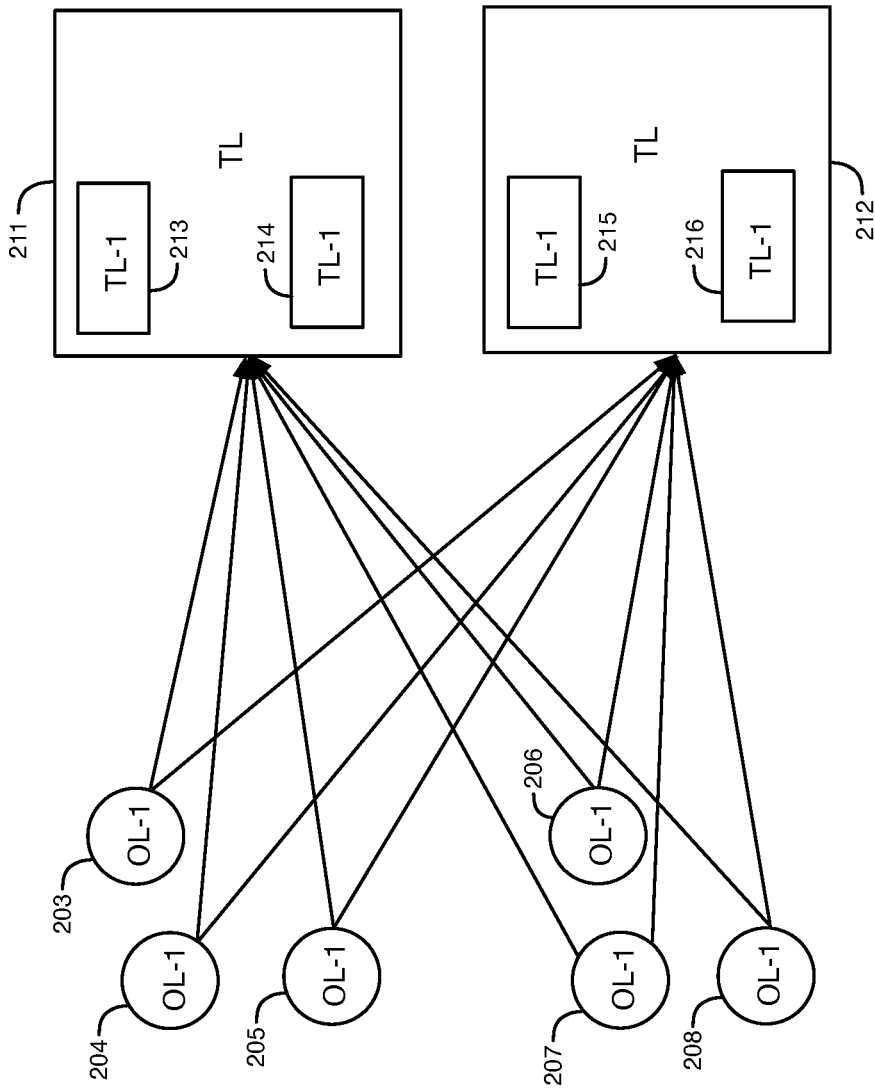
FIG. 2C is a diagram that illustrates a partially unclustered network graph with flows from objects on level L−1 to targets on level L.

FIGS. 2A-2C are diagrams that illustrate an example of the object split sub-procedure of the third stage of the algorithm for placement legalization. FIG. 2A is a diagram that illustrates flows from objects OL on top level L to targets TL on top level L in the pyramid during the object split sub-procedure. FIG. 2A illustrates two objects 201-202 in top level L and two targets 211-212 in top level L as examples. Object 201 includes objects (OL−1) 203-205 in level L−1 of the pyramid, and object 202 includes objects (OL−1) 206-208 in level L−1 of the pyramid as examples. Target 211 includes two targets (TL−1) 213-214 on level L−1 of the pyramid, and target 212 includes two targets (TL−1) 215-216 on level L−1 of the pyramid. FIG. 2A shows flows f11 and f12 from object 201 to targets 211-212, and flows f21-f22 from object 202 to targets 211-212, as examples.

FIG. 2B is a diagram that illustrates a formulation of the auxiliary transportation problem I for two of the flows f11-f12 shown in FIG. 2A. FIG. 2B shows edges from a source object 220 to the flow f11 221 and to the flow f12 222 and their respective costs (c=0) and capacities (u=|f11|, u=|f12|). FIG. 2B also shows edges from each of flows 221-222 to each of the objects 203-205 in level L−1 and their associated edge cost, which is the distance (dist.) from each object OL−1 to the target TL. FIG. 2B further shows edges from the objects 203-205 to the target 223 and their associated costs (c=0) and capacities (u=area(OL−1)).

FIG. 2C is a diagram that illustrates a partially unclustered network graph with flows from objects on level L−1 to targets on level L of the pyramid. FIG. 2C illustrates an example of how the auxiliary transportation problem can be solved for the objects on level L. FIG. 2C shows examples of flows (i.e., the arrows) from each of the 6 objects 203-208 on level L−1 to each of the two targets 211-212 on level L. Each of the 6 objects 203-208 has a flow to target 211 and a flow to target 212 in the example of FIG. 2C.

The object split sub-procedure is now described in further detail. For each object o of the top level L, where o∈OL, non-zero flows f(o,TL) from o are selected. For each cluster $o_l$, small size auxiliary transportation problems are formulated. In these auxiliary transportation problems, objects are flows f (o, TL), targets $o_l$ are children on level L−1, $o_l$∈o, where l=1, . . . |o| is the number of children. The auxiliary transportation problem target capacitances are areas of $o_l$. The solution of the object split sub-procedure provides flows from all objects on level L−1 to the targets on level L, as shown, for example, in FIG. 2C.

An example of the target split sub-procedure is now disclosed for the propagation of the precomputed flow from the partially unclustered graph obtained from the object split sub-procedure to the network graph corresponding to pyramid level L−1. For each cluster of targets on the level L of the pyramid, an auxiliary transportation problem II is formulated. With the solution to the auxiliary transportation problem II, incoming flows from objects to the targets are assigned to the target sub-clusters. In the auxiliary transportation problem II, flows connect the objects to target cluster children belonging to level L−1. The cost of each edge is the distance from the object on level L−1 to the target on level L−1 of the pyramid.

Figure 3A:
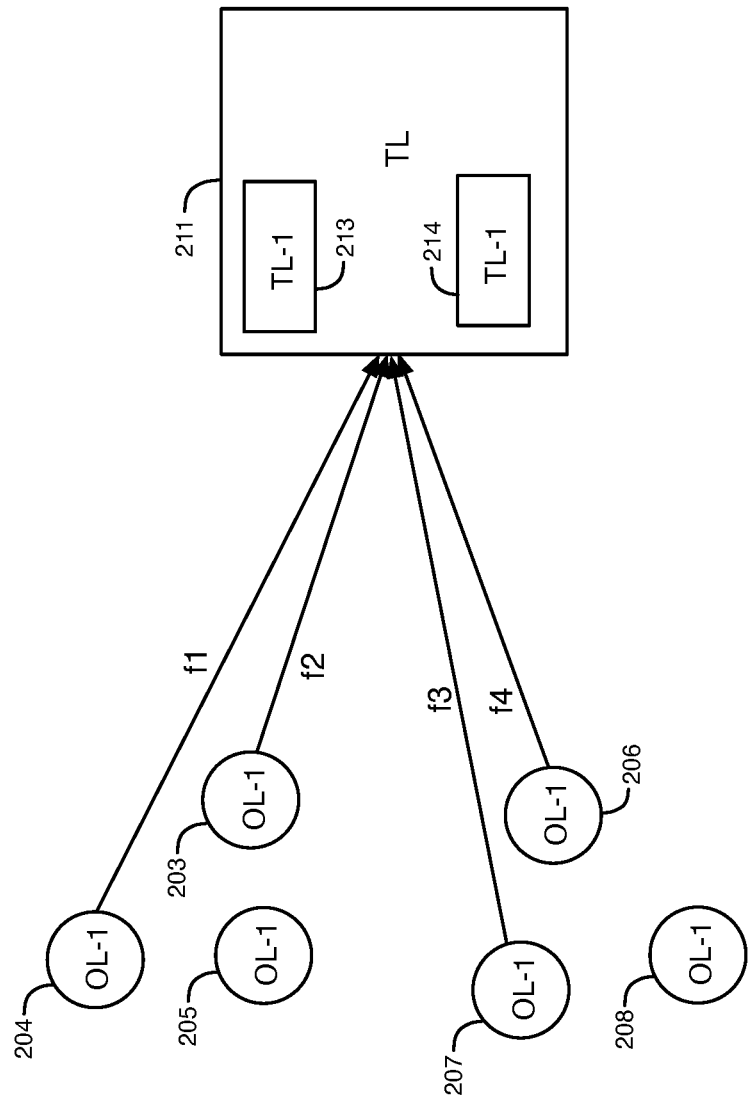
FIG. 3A is a diagram that illustrates flows that are computed from objects OL−1 on level L−1 to a target on top level L in the pyramid during a target split sub-procedure.
Figure 3B:
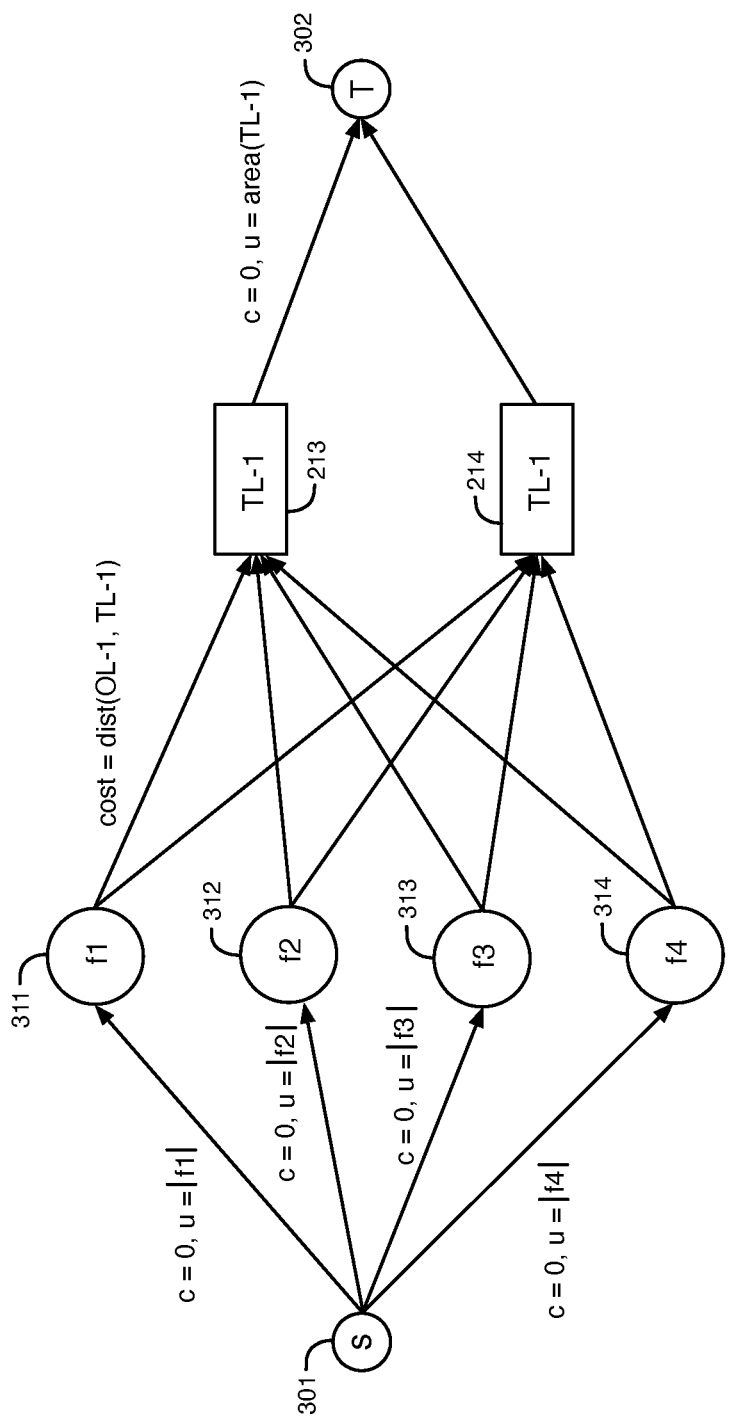
FIG. 3B is a diagram that illustrates a formulation of the auxiliary transportation problem II using flows computed with auxiliary transportation problem I of FIG. 2B.
Figure 3C:
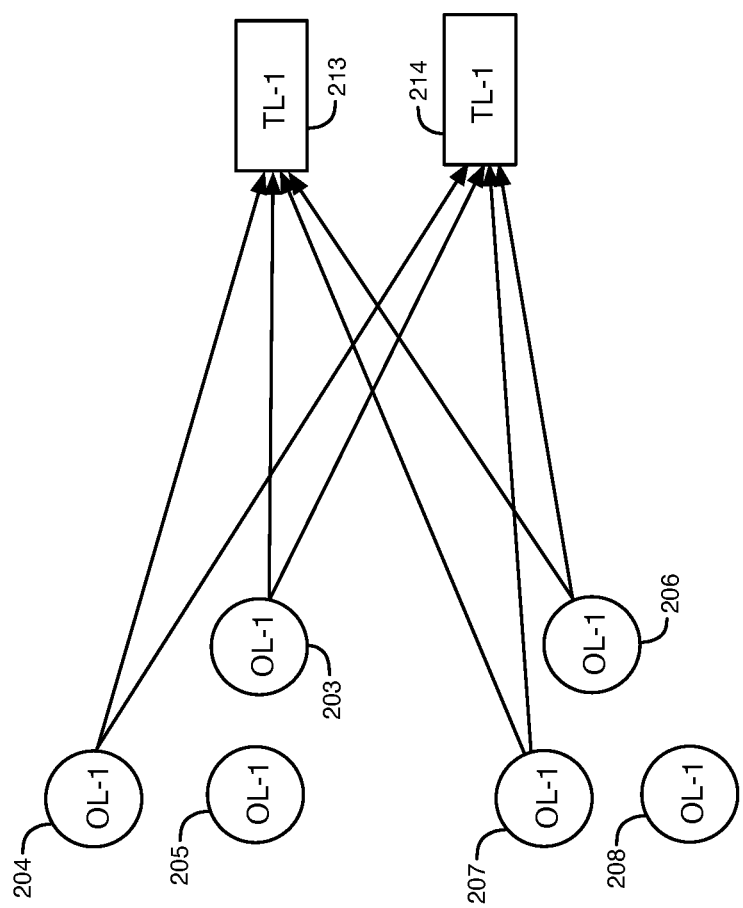
FIG. 3C is a diagram that illustrates a graph calculated with the auxiliary transportation problem II that provides valid flows from objects on level L−1 to targets on level L−1.

FIGS. 3A-3C are diagrams that illustrate an example of the target split sub-procedure of the third stage of the algorithm for placement legalization. FIG. 3A is a diagram that illustrates flows that are computed from objects OL−1 on level L−1 to a target 211 on top level L in the pyramid during the target split sub-procedure. FIG. 3A shows flows f1, f2, f3, and f4 from objects 204, 203, 207, and 206, respectively, to target 211 as examples. In the example of FIG. 3A, objects 205 and 208 do not have flows to target 211.

FIG. 3B is a diagram that illustrates a formulation of the auxiliary transportation problem II using flows computed with auxiliary transportation problem I of FIG. 2B. FIG. 3B shows flows f1-f4 311-314 from objects OL−1 to target TL that are split into sub-flows from objects OL−1 to sub-clusters of targets 213-214 TL−1. As a result, flows are created from objects OL−1 to targets TL−1 that provide a solution of the propagation from level L to level L−1.

FIG. 3B shows edges from a source object 301 to the flows f1-f4 311-314 and their respective costs (c=0) and capacities (u=|f1|, u=|f2|, u=|f3|, u=|f4|). FIG. 3B also shows edges from each of the flows 311-314 to each of the targets 213-214 in level L−1 and their associated edge cost, which is the distance (dist.) from each object OL−1 to the target TL−1. FIG. 3B further shows edges from the targets 213-214 to the target 302 and their associated costs (c=0) and capacities (u=area(TL−1)).

FIG. 3C is a diagram that illustrates a graph calculated with the auxiliary transportation problem II that provides valid flows from objects on level L−1 to targets on level L−1. FIG. 3C illustrates an example of how the auxiliary transportation problem II can be solved for the objects and targets on level L−1. FIG. 3C shows examples of flows (i.e., the arrows) from each of 4 of the objects 203, 204, 206, and 207 on level L−1 to each of the two targets 213-214 on level L−1. Each of the 4 objects 203, 204, 206, and 207 has a flow to target 213 and a flow to target 214 in the example of FIG. 3C.

The target split sub-procedure is now described in further detail. For each target TL of the level L, where t∈TL, non-zero flows f(OL−1,t) are selected from objects on level L−1 to target t. For each target t, where t∈TL, an auxiliary transportation problem II is formulated to assign incoming flows to the target t children. In the auxiliary transportation problem II, objects are flows f(OL−1,t), the targets are target children on level L−1, and $t_l$∈t, where l=1, . . . |t| are the number of children. The auxiliary transportation problem II target capacitances are capacitances of targets on level L−1 ($t_l$). The solution of this problem provides flows from all of the objects on level L−1 to the targets on level L−1, as shown, for example in FIG. 3C.

The sub-procedure for level optimization may then be applied to reduce approximation error in the solution generated using the object split and target split sub-procedures. Level optimization may be an optional sub-procedure. In the level optimization sub-procedure, a set of windows is chosen on each level of the pyramid. The windows contain objects, targets with non-zero flows, and neighboring targets. The choice of the windows can be made if all of the targets are to be placed on the IC device. Then, an auxiliary transportation problem III for each window is formulated and solved. Objects in the auxiliary transportation problem III are objects on the level L−1 with non-zero flows to any of the targets in the window. To obtain better results, a window shift is applied, and the shifted transportation problem III is solved for the shifted window. The solution with minimal flow cost is chosen.

The approximation error in the solution generated using the object split and target split sub-procedures on the pyramid level L−1 can be improved by using the windowing technique described above. As an example, a window may be chosen having a small number of objects or targets. Then, a set of independent auxiliary transportation problems III are solved for the window. Each of the auxiliary transportation problems III is solved for the objects belonging to the window. Targets are selected based on the non-zero flow edges. Targets in the neighborhood may be selected as well. As a result, the third stage of the algorithm that includes the object split, target split, and level optimization sub-procedures computes an approximated solution of the assignment problem on the pyramid level L−1 from the flows of pyramid level L. After the assignments have been computed by the third stage of the algorithm for each of the pyramid levels, the approximate solution of the original flat large dimensional problem is obtained. Any technique for the solution of the auxiliary minimum cost maximum flow problem can be used.

Figure 4A:
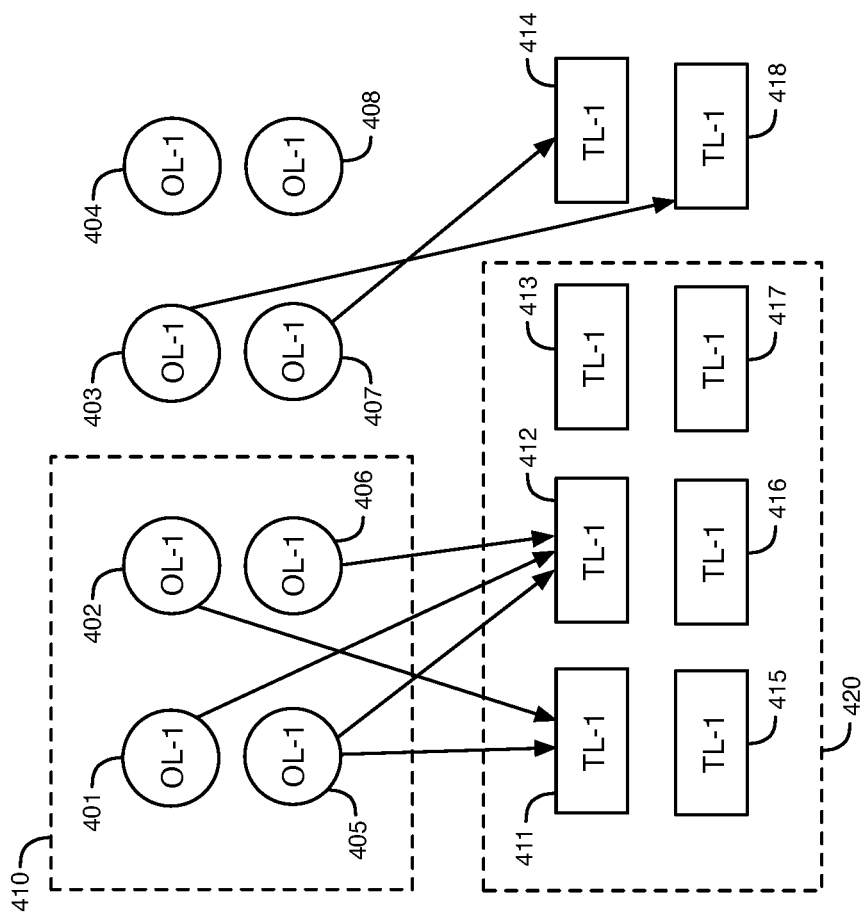
FIGS. 4A-4B are diagrams that illustrate examples of the level optimization sub-procedure using windows on level L−1 of a pyramid.
Figure 4B:
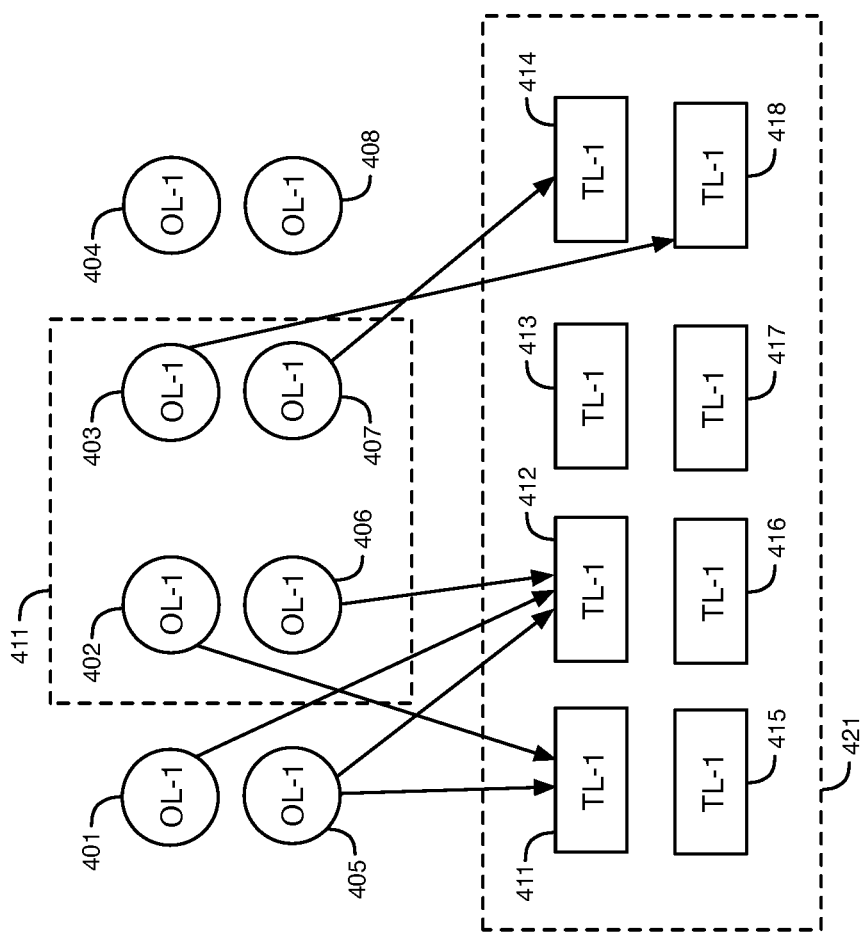

FIGS. 4A-4B are diagrams that illustrate examples of the level optimization sub-procedure using windows on level L−1 of a pyramid. FIG. 4A shows a window 410 that includes 4 objects 401-402 and 405-406 on level L−1 of the pyramid and a window 420 that includes 6 targets 411-413 and 415-417 on level L−1. FIG. 4A also shows additional objects 403-404 and 407-408 that are on level L−1 that are not in window 410 and 2 additional targets 414 and 418 that are on level L−1 and that are not in window 420. FIG. 4A shows flows (arrows) from objects 401-403 and 405-407 to targets 411-412, 414, and 418. The targets 411-413 and 415-417 either have non-zero flow incoming edges or are geometrically close to non-zero flow targets in the IC device. An auxiliary transportation problem III for windows 410 and 420 is then formulated and solved.

A window shift is then applied to windows 410 and 420 to generate the shifted windows, as shown for example in FIG. 4B, to choose the best cost solution. FIG. 4B shows a shifted window 411 that includes 4 objects 402-403 and 406-407 on level L−1 of the pyramid and a shifted window 421 that includes 8 targets 411-418 on level L−1. FIG. 4B shows the same flows (arrows) that are shown in FIG. 4A. An auxiliary transportation problem III for shifted windows 411 and 421 is then formulated and solved to choose the best cost solution with the least penalty.

At each step of the solution propagation, a set of small independent minimum cost maximum flow problems are formulated and solved in parallel. After the target split and level optimization sub-procedures, a flow solution on the level L−1 is obtained. The object split, target split, and level optimization sub-procedures can then be repeated until the lowest level of the pyramid is reached. If it is assumed that the pyramid of targets is preconstructed, then computational complexity weakly depends on the number of sites (targets). Standard analysis shows that the complexity of the pyramidal legalization algorithm is O(|V| log |V| log |T|), where |V| is the number of instances in the circuit design netlist, and |T| is the number targets.

Figure 5:
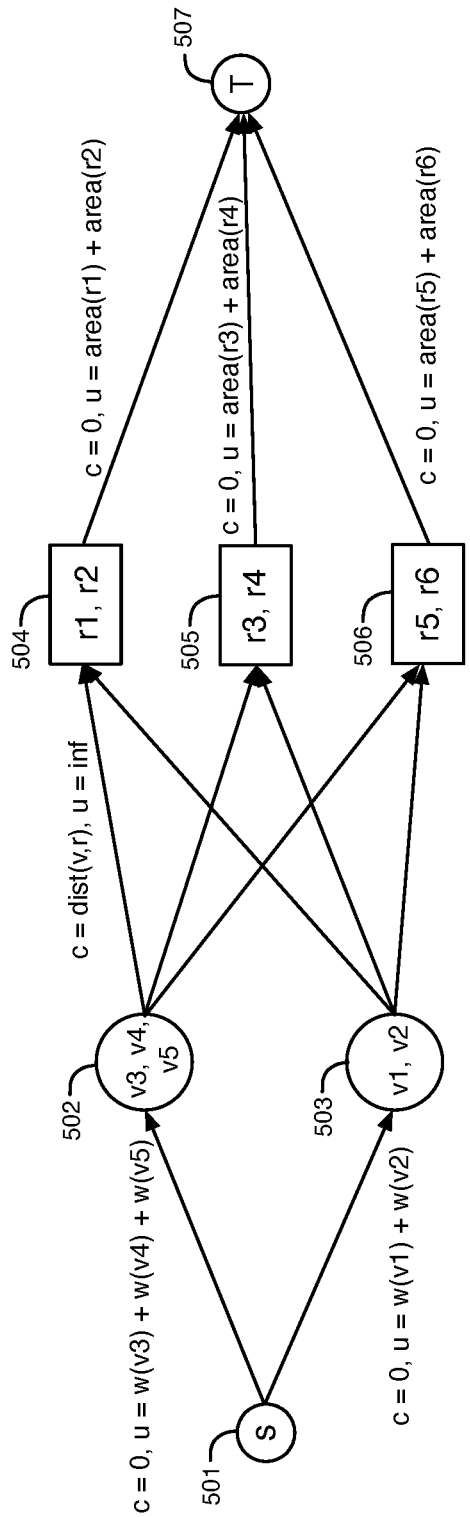
FIG. 5 is a diagram of an example of a transportation graph on a level of the pyramid.

FIG. 5 is a diagram of an example of a transportation graph on the level 1 of the pyramid. The transportation graph of FIG. 5 includes a source 501, clusters of vertices 502-503, clusters of subregions 504-506 of an IC device, and a target 507. Geometrically close vertices (e.g., circuit blocks) are merged into clusters in the graph of FIG. 5. For example, vertices v1 and v2 are merged into cluster 503, and vertices v3, v4, and v5 are merged into cluster 502. Geometrically close IC device subregions r1-r6 are merged into clusters 504-506. For example, subregions r1 and r2 are merged into cluster 504, subregions r3 and r4 are merged into cluster 505, and subregions r5 and r6 are merged into cluster 506. The circuits in the subregions in the same cluster may be the same or similar types of circuits. For example, the circuits in subregions r1-r2 may be logic circuits, the circuits in subregions r3-r4 may be adder circuits, and the circuits in subregions r5-r6 may be sequential circuits such as flip-flops. Edges are shown by arrows in FIG. 5. The costs of the edges in the graph of FIG. 5 are the same as the costs of the edges in the graph of FIG. 1. The capacities u of the edges in the graph of FIG. 5 are the sum of merged edges from FIG. 1. For example, the capacity of the edge from source 501 to cluster 503 is w(v1)+w(v2). As another example, the capacity of the edge from cluster 504 to target 507 is area(r1)+area(r2). A solution is generated by searching for flows through the graph of FIG. 5 from source 501 to target 507 that cause the sum of the edges (c(e)*f(e) for each edge) to be minimized.

Figure 6A:
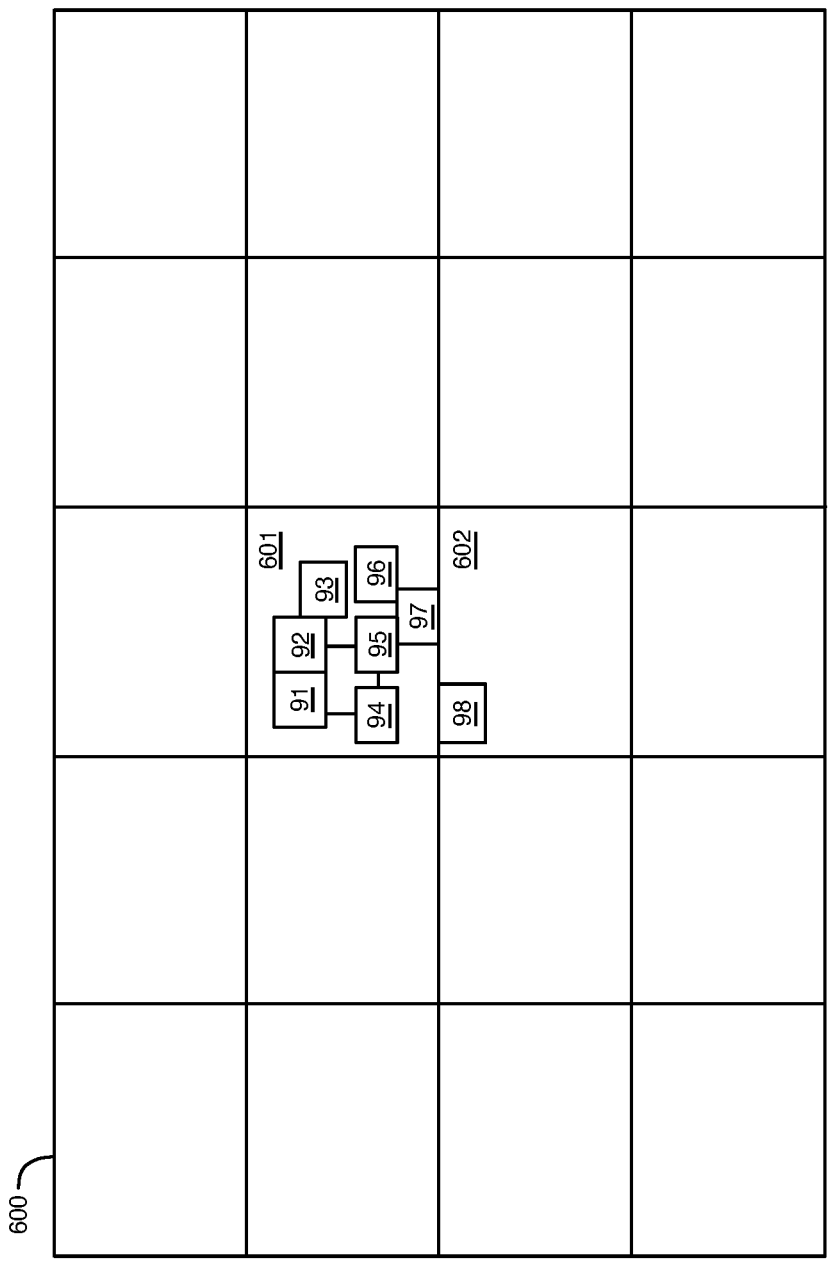
FIGS. 6A-6C are diagrams that illustrate examples of the circuit legalization problem with minimal displacement.
Figure 6B:
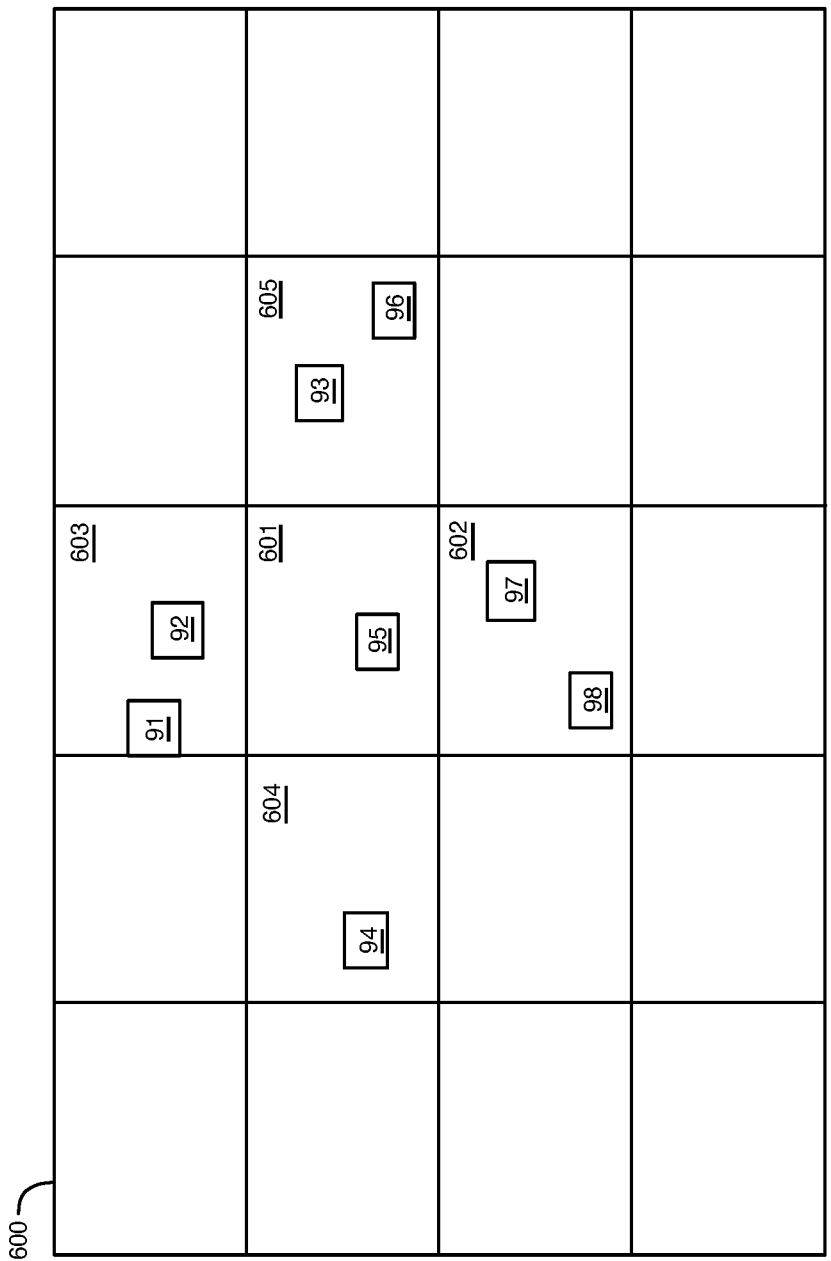
Figure 6C:
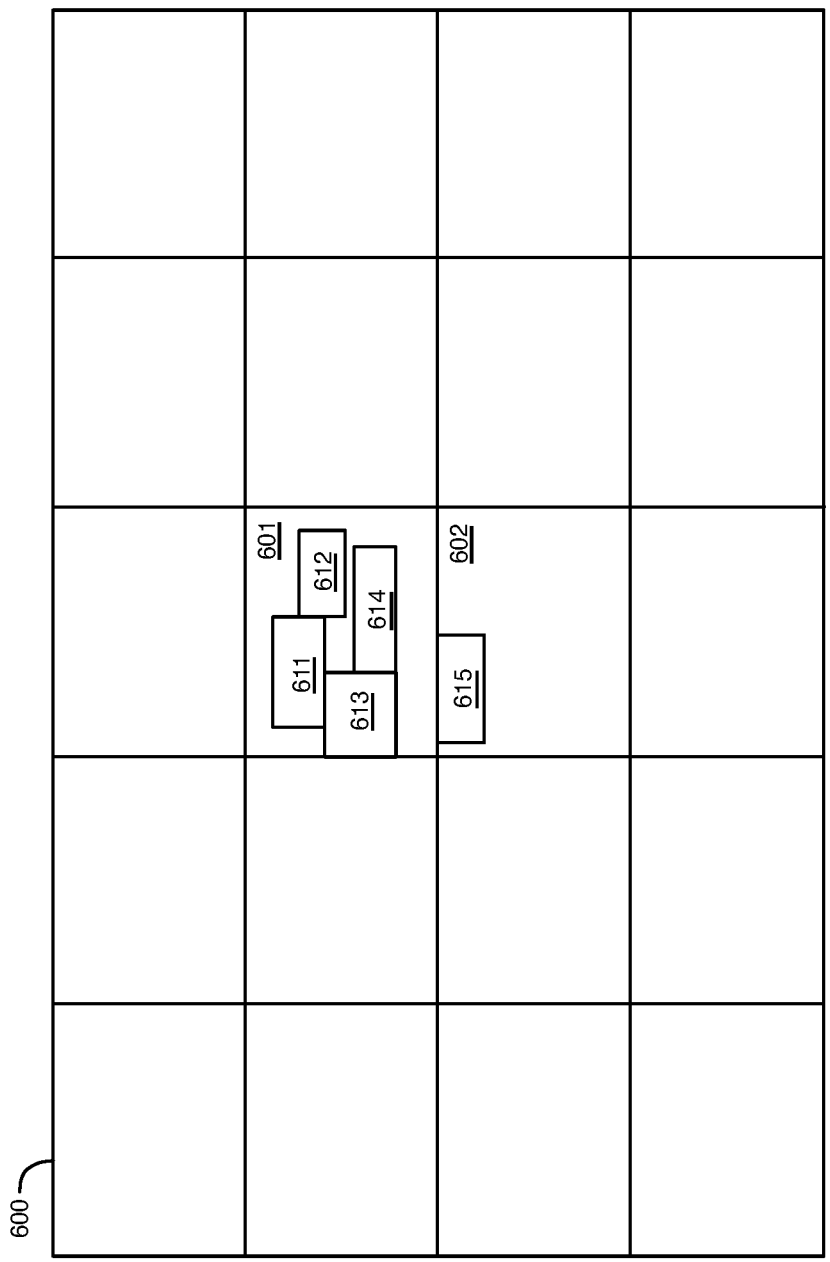

FIGS. 6A-6C are diagrams that illustrate examples of the circuit legalization problem with minimal displacement. FIGS. 6A-6C illustrate an integrated circuit (IC) device 600 that is divided into 20 rectangular regions, including regions 601-605. The device 600 contains bins with a capacity of 2. FIG. 6A shows an initial illegal placement of 8 bins 91-98 (i.e., bins of the targets) in regions 601-602 of the device 600 having a density overflow. FIG. 6B shows a modified placement of the 8 bins 91-98 that has been legalized. In the modified placement of FIG. 6B, bins 91-98 have been moved from regions 601-602 in the placement of FIG. 6A to regions 601-605. In the modified placement of FIG. 6B, the density of the bins 91-98 in device 600 has been satisfied. The bins 91-98 are moved from the placement of FIG. 6A to the placement of FIG. 6B with a minimized sum of displacement compared to the original placement of FIG. 6A.

FIG. 6C is a diagram that illustrates examples of device bins (i.e., bins of targets) that are geometrically close on the IC device 600 that have been merged into larger bins. In the example of FIG. 6C, circuit blocks (i.e., objects) that are close in the circuit design are merged into larger circuit blocks. FIG. 6C shows 5 bins 611-615 in regions 601-602. In the example of FIG. 6C, the 8 bins 91-98 of targets shown in FIG. 6A are merged into 5 larger bins 611-615.

Figure 7:
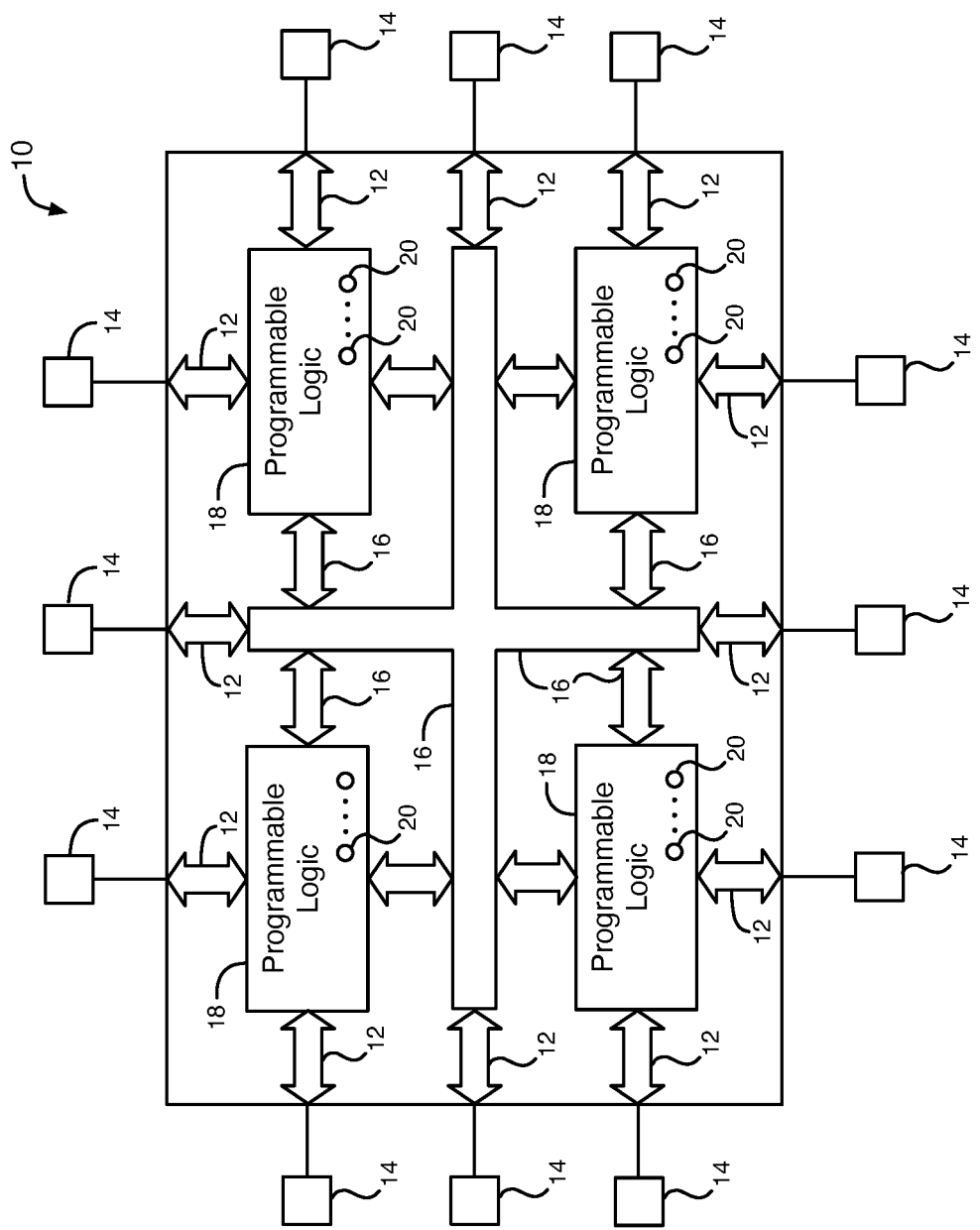
FIG. 7 is a diagram of an illustrative programmable integrated circuit.

An illustrative programmable logic integrated circuit (IC) 10 is shown in FIG. 7. As shown in FIG. 7, programmable logic integrated circuit 10 may have input-output circuitry 12 for driving signals off of IC 10 and for receiving signals from other devices via input-output pins 14. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). Programmable logic circuitry 18 may include combinational and sequential logic circuitry. The programmable logic circuitry 18 may be configured to perform custom logic functions.

Programmable logic IC 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic circuitry 18. Typically, the memory element output signals are used to control the gates of metal-oxide-semiconductor (MOS) transistors.

Figure 8:
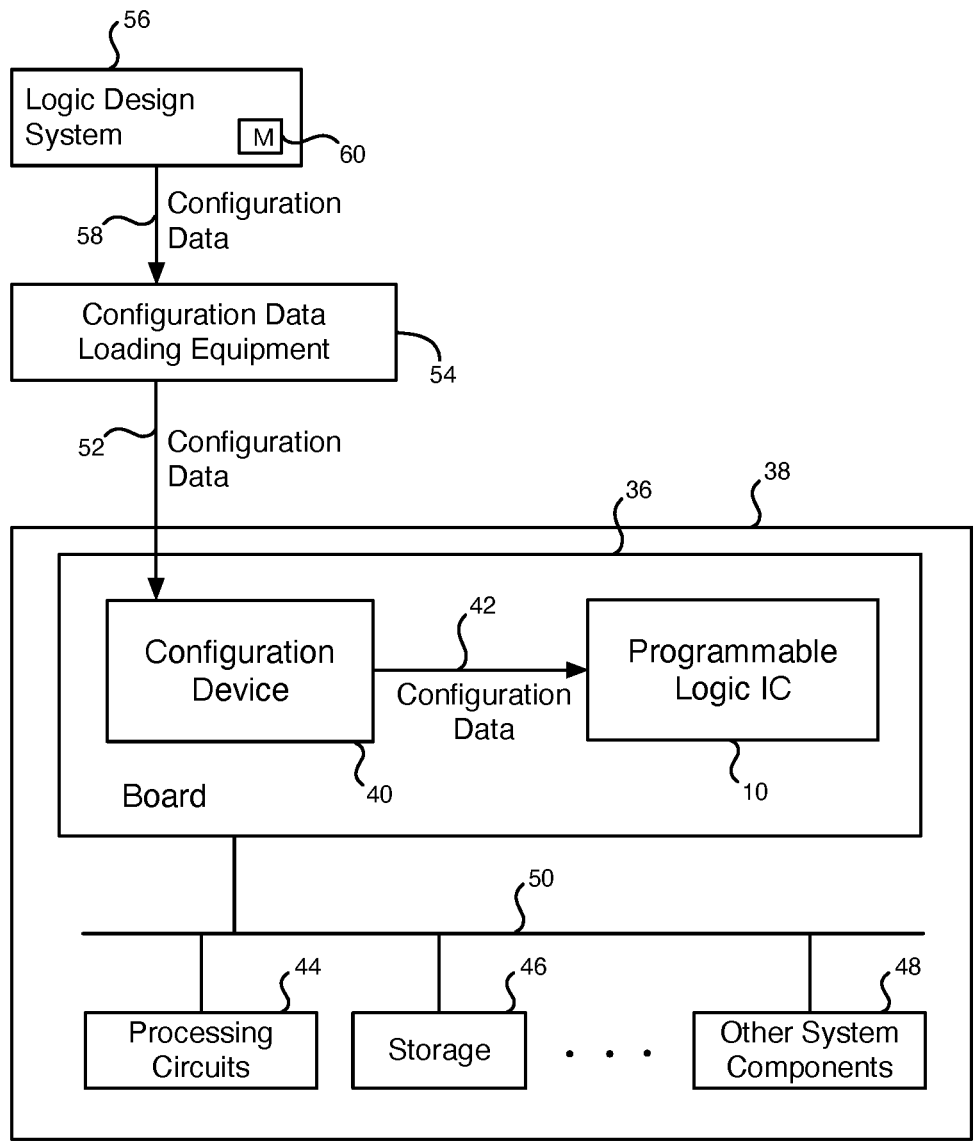
FIG. 8 is a diagram showing how configuration data is created by a logic design system and loaded into a programmable logic integrated circuit (IC) to configure the IC for operation in a system.

An illustrative system environment for IC 10 is shown in FIG. 8. IC 10 may be mounted on a board 36 in a system 38. In general, programmable logic IC 10 may receive configuration data from programming equipment or from other suitable equipment or device. In the example of FIG. 8, programmable IC 10 is a type of programmable logic device that receives configuration data from an associated configuration device 40. With this type of arrangement, configuration device 40 may, if desired, be mounted on the same board 36 as programmable logic IC 10.

Configuration device 40 may be an erasable-programmable read-only memory (EPROM) chip, a programmable logic device configuration data loading chip with built-in memory, or other suitable device. When system 38 boots up (or at another suitable time), the configuration data for configuring the programmable logic IC 10 may be supplied to the programmable logic IC 10 from device 40, as shown schematically by path 42. The configuration data that is supplied to programmable logic IC 10 may be stored in programmable logic IC 10 in its configuration random-access-memory elements 20.

System 38 may include processing circuits 44, storage 46, and other system components 48 that communicate with IC 10. The components of system 38 may be located on one or more boards such as board 36 or other suitable mounting structures or housings and may be interconnected by buses, traces, and other electrical paths 50.

Configuration device 40 may be supplied with the configuration data for IC 10 over a path such as path 52. Configuration device 40 may, for example, receive the configuration data from configuration data loading equipment 54 or other suitable equipment that stores this data in configuration device 40. Device 40 may be loaded with data before or after installation on board 36.

In the example of FIG. 8, a logic design system 56 generates the configuration data. The configuration data produced by the logic design system 56 may be provided to equipment 54 over a path such as path 58. The equipment 54 provides the configuration data to device 40, so that device 40 can later provide this configuration data to the programmable logic IC 10 over path 42. Logic design system 56 may be based on one or more computers and one or more software programs. In general, software and data may be stored on any computer-readable medium (storage) in system 56 and is shown schematically as storage 60 in FIG. 8.

In a typical scenario, logic design system 56 is used by a logic designer to create a circuit design for IC 10. The system 56 produces corresponding configuration data that is provided to configuration device 40. Upon power-up, configuration device 40 and data loading circuitry in programmable IC 10 is used to load the configuration data into memory cells 20 of IC 10. IC 10 may then be used in normal operation of system 38.

After IC 10 is initially loaded with a set of configuration data (e.g., using configuration device 40), IC 10 may be reconfigured by loading a different set of configuration data. Sometimes, it may be desirable to reconfigure only a portion of the memory cells in IC 10 via a process referred to as partial reconfiguration. As memory cells are typically arranged in an array, partial reconfiguration can be performed by writing new data values only into selected portion(s) in the array, while leaving portions of the array other than the selected portion(s) in their original state.

It can be a significant undertaking to design and implement a desired (custom) logic circuit design in a programmable logic integrated circuit (IC). Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic IC.

Figure 9:
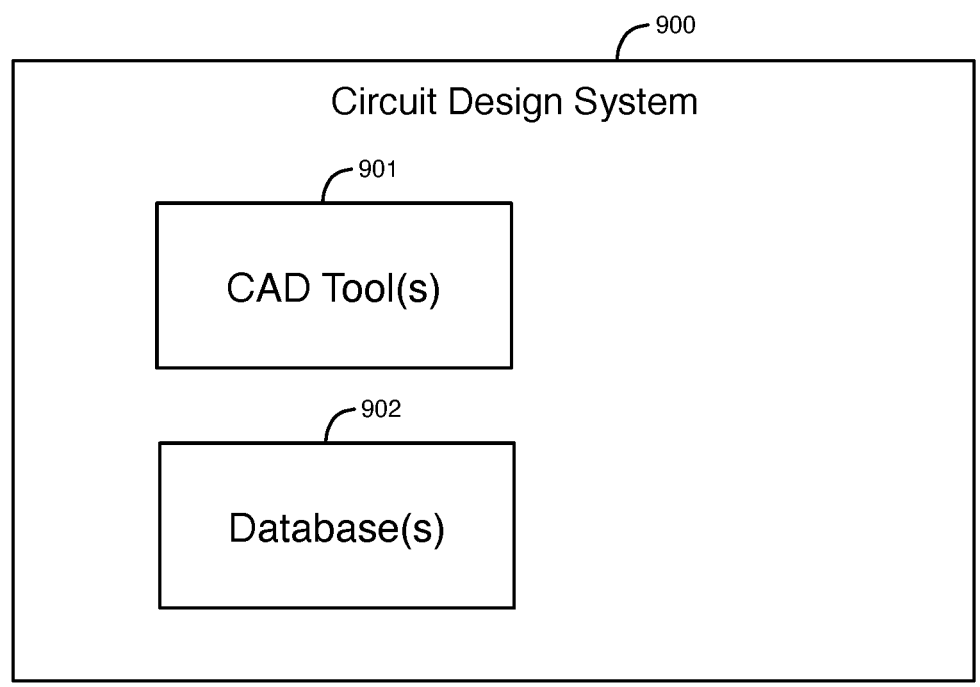
FIG. 9 is a diagram of a circuit design system that may be used to design integrated circuits.

An illustrative circuit design system 900 in accordance with an example is shown in FIG. 9. If desired, the circuit design system of FIG. 9 may be used in a logic design system such as logic design system 56 shown in FIG. 8. Circuit design system 900 may be implemented on integrated circuit design computing equipment. Circuit design system 900 may, for example, include one or more networked computers with processors, memory, mass storage, input/output devices, etc. System 900 may, for example, be based on one or more processors such as personal computers, workstations, etc. The processor(s) may be linked using a network (e.g., a local or wide area network). Memory in these computers or external memory and storage devices may be used to store instructions and data.

Software-based components such as computer-aided design (CAD) tools 901 and databases 902 reside on system 900. During operation, executable software such as the software of computer aided design tools 901 runs on the processor(s) of system 900. Databases 902 are used to store data for the operation of system 900. In general, software and data may be stored in non-transitory computer readable storage media (e.g., tangible computer readable storage media). Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 900. When the software of system 900 is installed, the storage of system 900 has instructions and data that cause the computing equipment in system 900 to execute various methods (processes). When performing these processes, the computing equipment is configured to implement the functions of circuit design system 900.

The computer aided design (CAD) tools 901, some or all of which are sometimes referred to collectively as a CAD tool, a circuit design tool, or an electronic design automation (EDA) tool, may be provided by a single vendor or by multiple vendors. Tools 901 may be provided as one or more suites of tools (e.g., a compiler suite for performing tasks associated with implementing a circuit design in a programmable IC) and/or as one or more separate software components (tools). Database(s) 902 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 10:
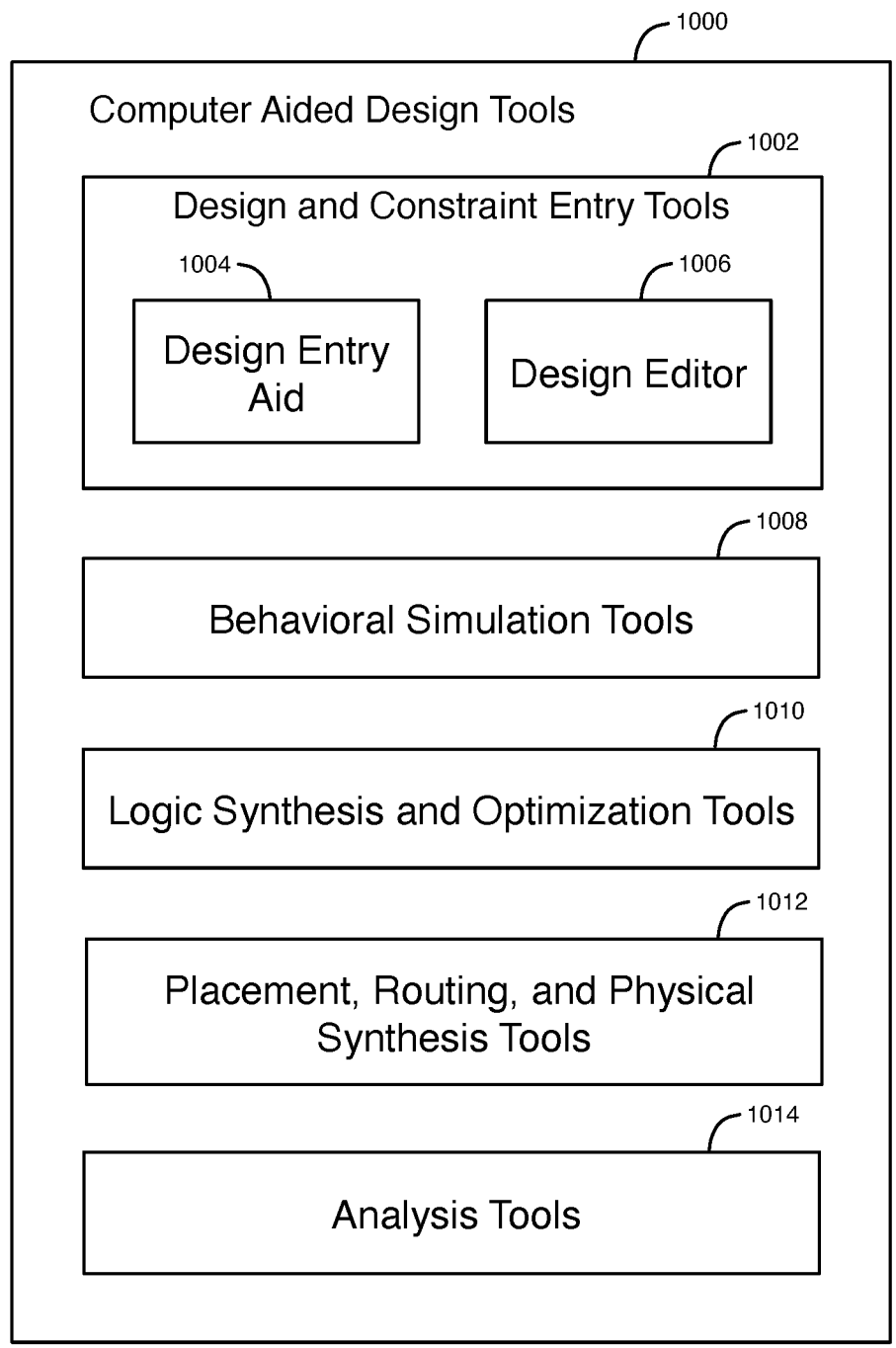
FIG. 10 is a diagram of illustrative computer-aided design (CAD) tools that may be used in a circuit design system.

Illustrative computer aided design tools 1000 that may be used in a circuit design system such as circuit design system 900 of FIG. 9 are shown in FIG. 10. The design process may start with the formulation of functional specifications of the integrated circuit design (e.g., a functional or behavioral description of the integrated circuit design). A circuit designer may specify the functional operation of a desired circuit design using design and constraint entry tools 1002. Design and constraint entry tools 1002 may include tools such as design and constraint entry aid 1004 and design editor 1006. Design and constraint entry aids such as aid 1004 may be used to help a circuit designer locate a desired design from a library of existing circuit designs and may provide computer-aided assistance to the circuit designer for entering (specifying) the desired circuit design. Design and constraint entry tools 1002 may allow a circuit designer to enter timing constraints for the desired circuit design through aid 1004.

As an example, design and constraint entry aid 1004 may be used to present screens of options for a user. The user may click on on-screen options to select whether the circuit being designed should have certain features. Design editor 1006 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 1002 may be used to allow a circuit designer to provide a desired circuit design using any suitable format. For example, design and constraint entry tools 1002 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 1002 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 1002 may allow the circuit designer to provide a circuit design to the circuit design system 900 using a hardware description language. The designer of the integrated circuit design can enter the circuit design by writing hardware description language code with editor 1006. Blocks of code may be imported from user-maintained or commercial libraries if desired.

After the circuit design has been entered using design and constraint entry tools 1002, behavioral simulation tools 1008 may be used to simulate the functionality of the circuit design. If the functionality of the design is incomplete or incorrect, the circuit designer can make changes to the circuit design using design and constraint entry tools 1002. The functional operation of the new circuit design may be verified using behavioral simulation tools 1008 before synthesis operations have been performed using tools 1010. Simulation tools such as behavioral simulation tools 1008 may also be used at other stages in the design flow if desired (e.g., after logic synthesis). The output of the behavioral simulation tools 1008 may be provided to the circuit designer in any suitable format (e.g., truth tables, timing diagrams, etc.).

Once the functional operation of the circuit design has been determined to be satisfactory, logic synthesis and optimization tools 1010 may generate a gate-level netlist of the circuit design, for example, using gates from a particular library pertaining to a targeted process supported by a foundry that has been selected to produce the integrated circuit. Alternatively, logic synthesis and optimization tools 1010 may generate a gate-level netlist of the circuit design using gates of a targeted programmable IC (i.e., in the logic and interconnect resources of a particular programmable IC product or product family).

Logic synthesis and optimization tools 1010 may optimize the circuit design by making appropriate selections of hardware to implement different logic functions in the circuit design based on the circuit design data and constraint data entered by the logic designer using tools 1002. As an example, logic synthesis and optimization tools 1010 may perform multi-level logic optimization and technology mapping based on the length of a combinational path between registers in the circuit design and corresponding timing constraints that were entered by the logic designer using tools 1002.

After logic synthesis and optimization using tools 1010, the circuit design system 900 may use tools such as placement, routing, and physical synthesis tools 1012 to perform physical design steps (layout synthesis operations). Tools 1012 can be used to determine where to place each gate of the gate-level netlist produced by tools 1010. For example, tools 1012 may implement the placement techniques disclosed herein with respect to FIGS. 1-6C. Tools 1012 create orderly and efficient implementations of circuit designs for any targeted integrated circuit (e.g., for a given programmable integrated circuit or structured ASIC).

Tools such as tools 1010 and 1012 may be part of a compiler suite (e.g., part of a suite of compiler tools provided by a programmable IC vendor). Tools 1010, 1012, and 1014 may also include timing analysis tools. The timing analysis tools allow tools 1010 and 1012 to satisfy performance requirements (e.g., timing requirements) before producing the integrated circuit.

After an implementation of the desired circuit design has been generated using tools 1012, the implementation of the design may be analyzed and tested using analysis tools 1014. For example, analysis tools 1014 may include timing analysis tools, power analysis tools, or formal verification tools, just to name few. After satisfactory optimization operations have been completed using tools 1000 and depending on the targeted integrated circuit technology, tools 1000 may produce a mask-level layout description of the integrated circuit (e.g., for a structured ASIC) or configuration data for programming the programmable logic IC.

Example 1 is a method for using an integrated circuit placement tool to place a circuit design for an integrated circuit, the method comprising: generating a graph comprising objects and targets in a first level of a pyramid; generating clusters of objects in a second level of the pyramid in each of the objects in the first level, wherein the second level is different than the first level; generating clusters of targets in the second level in each of the targets in the first level, wherein the objects in the first and the second levels comprise circuit blocks in the circuit design, wherein the targets in the first and the second levels comprise subregions of the integrated circuit; and generating first flows from the objects in the second level to the targets in the second level for an output placement of the circuit blocks that satisfies at least one constraint of the integrated circuit.

In Example 2, the method of Example 1 may optionally include, wherein generating the clusters of the objects in the second level of the pyramid comprises causing each of the objects in the first level to have the objects in the second level that are close in the circuit design, and wherein generating the clusters of the targets in the second level comprises causing each of the targets in the first level to have geometrically close ones of the subregions of the integrated circuit.

In Example 3, the method of any one of Examples 1-2 may optionally include, wherein the first level of the pyramid corresponds to a transportation problem, wherein the second level of the pyramid corresponds to small dimensional transportation problems, and wherein the first flows correspond to a solution of the transportation problem.

In Example 4, the method of any one of Examples 1-3 may optionally include, wherein generating the first flows from the objects in the second level to the targets in the second level further comprises: formulating first auxiliary transportation problems for each of the clusters of the objects in the second level of the pyramid; and generating solutions to the first auxiliary transportation problems by generating second flows from the objects in the second level to the targets in the first level.

In Example 5, the method of Example 4 may optionally include, wherein generating the first flows from the objects in the second level to the targets in the second level further comprises: formulating second auxiliary transportation problems for each of the clusters of the targets in the second level based on the first auxiliary transportation problems; and generating solutions to the second auxiliary transportation problems by generating the first flows from the objects in the second level to the targets in the second level.

In Example 6, the method of any one of Examples 1-5 may further comprise: generating a first window comprising a first subset of the objects in the second level; generating a second window comprising a first subset of the targets in the second level; and solving an auxiliary transportation problem for the first and the second windows using third flows from the first subset of the objects in the first window to the first subset of the targets in the second window.

In Example 7, the method of Example 6 may further comprise: shifting the first window to comprise a second subset of the objects in the second level; shifting the second window to comprise a second subset of the targets in the second level; and solving the auxiliary transportation problem for the shifted first window and the shifted second window using fourth flows from the second subset of the objects in the shifted first window to the second subset of the targets in the shifted second window.

In Example 8, the method of any one of Examples 1-7 may optionally include, wherein generating the first flows from the objects in the second level to the targets in the second level further comprises: moving at least a subset of the objects to at least a subset of the targets based on a sum of displacements of the objects moved from positions in an input placement to different positions in the output placement.

In Example 9, the method of any one of Examples 1-8 may further comprise: generating additional clusters of objects in additional levels of the pyramid in each of the objects in a next higher level of the pyramid; generating additional clusters of targets in the additional levels in each of the targets in the next higher level of the pyramid; and generating additional flows from objects in a third level of the pyramid to targets in a level of the pyramid higher than the third level using flows computed in the level of the pyramid higher than the third level for the output placement of the circuit blocks.

Example 10 is a non-transitory computer-readable storage medium comprising instructions stored thereon for causing a computer to execute a method of using an integrated circuit placement tool to place a circuit design for an integrated circuit, the method comprising: generating a graph comprising first flows between objects in a first level of a pyramid and targets in the first level of the pyramid; generating clusters of objects in a second level of the pyramid in each of the objects in the first level, wherein the second level is different than the first level; generating clusters of targets in the second level of the pyramid in each of the targets in the first level, wherein the objects in the first and the second levels comprise circuit blocks in the circuit design, and wherein the targets in the first and the second levels comprise subregions of the integrated circuit; and generating second flows from the objects in the second level to the targets in the second level for a placement of the circuit blocks that satisfies at least one area constraint of the integrated circuit.

In Example 11, the non-transitory computer-readable storage medium of Example 10 may optionally include, wherein generating the clusters of the objects in the second level of the pyramid comprises causing each of the objects in the first level to have the objects in the second level that are close in the circuit design, and wherein generating the clusters of the targets in the second level of the pyramid comprises causing each of the targets in the first level to have geometrically close ones of the subregions of the integrated circuit corresponding to the clusters of the targets in the second level.

In Example 12, the non-transitory computer-readable storage medium of any one of Examples 10-11 may optionally include, wherein the first level of the pyramid corresponds to a transportation problem, wherein the second level of the pyramid corresponds to small dimensional transportation problems, and wherein the second flows correspond to a solution of the transportation problem.

In Example 13, the non-transitory computer-readable storage medium of any one of Examples 10-12 may optionally include, wherein generating the second flows from the objects in the second level to the targets in the second level further comprises: formulating auxiliary transportation problems for each of the clusters of the objects in the second level of the pyramid; and generating solutions to the auxiliary transportation problems by generating third flows from the objects in the second level to the targets in the first level.

In Example 14, the non-transitory computer-readable storage medium of any one of Examples 10-13 may further comprise: generating a first window comprising a first subset of the objects in the second level; generating a second window comprising a first subset of the targets in the second level; and solving an auxiliary transportation problem for the first and the second windows using third flows from the first subset of the objects in the first window to the first subset of the targets in the second window.

In Example 15, the non-transitory computer-readable storage medium of Example 14 may optionally include, further comprising: shifting the first window to comprise a second subset of the objects in the second level; shifting the second window to comprise a second subset of the targets in the second level; and solving the auxiliary transportation problem for the shifted first window and the shifted second window using fourth flows from the second subset of the objects in the shifted first window to the second subset of the targets in the shifted second window.

Example 16 is a circuit design system configured to generate a circuit design for an integrated circuit, the circuit design system comprising: a placement tool configured to generate a graph comprising first flows between objects in a first level of a pyramid and targets in the first level of the pyramid, wherein the placement tool generates clusters of objects in a second level of the pyramid in each of the objects in the first level, wherein the second level is different than the first level, wherein the objects in the first and the second levels comprise circuit blocks in the circuit design, wherein the placement tool generates clusters of targets in the second level of the pyramid in each of the targets in the first level, wherein the targets in the first and the second levels comprise subregions of the integrated circuit, and wherein the placement tool generates second flows from the objects in the second level to the targets in the second level for a placement of the circuit blocks that satisfies at least one constraint of the integrated circuit.

In Example 17, the circuit design system of Example 16 may optionally include, wherein the placement tool causes each of the objects in the first level to have the clusters of the objects in the second level that are close in the circuit design, and wherein the placement tool causes each of the targets in the first level to have geometrically close ones of the subregions of the integrated circuit corresponding to the clusters of the targets in the second level.

In Example 18, the circuit design system of any one of Examples 16-17 may optionally include, wherein the first level of the pyramid corresponds to a transportation problem, wherein the second level of the pyramid corresponds to small dimensional transportation problems, and wherein the second flows from the objects in the second level to the targets in the second level correspond to a solution of the transportation problem.

In Example 19, the circuit design system of any one of Examples 16-18 may optionally include, wherein the placement tool formulates auxiliary transportation problems for each of the clusters of the objects in the second level of the pyramid and generates solutions to the auxiliary transportation problems by generating third flows from the objects in the second level to the targets in the first level.

In Example 20, the circuit design system of any one of Examples 16-19 may optionally include, wherein the placement tool generates a first window comprising a subset of the objects in the second level and a second window comprising a subset of the targets in the second level, and wherein the placement tool solves an auxiliary transportation problem for the first and the second windows using third flows from the subset of the objects in the first window to the subset of the targets in the second window.

In Example 21, the circuit design system of Example 19 may optionally include, wherein the placement tool formulates additional auxiliary transportation problems for each of the clusters of the targets in the second level based on the auxiliary transportation problems, and wherein the placement tool generates solutions to the additional auxiliary transportation problems by generating the first flows from the objects in the second level to the targets in the second level.

In Example 22, the circuit design system of any one of Examples 16-21 may optionally include: wherein the placement tool generates additional clusters of objects in a third level of the pyramid in each of the objects in a next higher level of the pyramid, wherein the placement tool generates additional clusters of targets in the third level in each of the targets in the next higher level of the pyramid, and wherein the placement tool generates additional flows from the objects in the third level of the pyramid to the targets in the third level of the pyramid for the placement of the circuit blocks.

The foregoing description of the examples has been presented for the purpose of illustration. The foregoing description is not intended to be exhaustive or to be limiting to the examples disclosed herein. In some instances, various features can be employed without a corresponding use of other features as set forth. Many modifications, substitutions, and variations are possible in light of the above teachings.

What is claimed is:

1. A method for using an integrated circuit placement tool to place a circuit design for an integrated circuit, the method comprising:
   generating a graph comprising objects and targets in a first level of a pyramid;
   generating clusters of objects in a second level of the pyramid in each of the objects in the first level, wherein the second level is different than the first level;
   generating clusters of targets in the second level in each of the targets in the first level, wherein the objects in the first and the second levels comprise circuit blocks in the circuit design, and wherein the targets in the first and the second levels comprise subregions of the integrated circuit; and
   generating first flows from the objects in the second level to the targets in the second level for an output placement of the circuit blocks that satisfies at least one constraint of the integrated circuit.

2. The method of claim 1, wherein generating the clusters of the objects in the second level of the pyramid comprises causing each of the objects in the first level to have the objects in the second level that are close in the circuit design, and wherein generating the clusters of the targets in the second level comprises causing each of the targets in the first level to have geometrically close ones of the subregions of the integrated circuit.

3. The method of claim 1, wherein the first level of the pyramid corresponds to a transportation problem, wherein the second level of the pyramid corresponds to small dimensional transportation problems, and wherein the first flows correspond to a solution of the transportation problem.

4. The method of claim 1, wherein generating the first flows from the objects in the second level to the targets in the second level further comprises:
   formulating first auxiliary transportation problems for each of the clusters of the objects in the second level of the pyramid; and
   generating solutions to the first auxiliary transportation problems by generating second flows from the objects in the second level to the targets in the first level.

5. The method of claim 4, wherein generating the first flows from the objects in the second level to the targets in the second level further comprises:
   formulating second auxiliary transportation problems for each of the clusters of the targets in the second level based on the first auxiliary transportation problems; and
   generating solutions to the second auxiliary transportation problems by generating the first flows from the objects in the second level to the targets in the second level.

6. The method of claim 1 further comprising:
generating a first window comprising a first subset of the objects in the second level;
generating a second window comprising a first subset of the targets in the second level; and
solving an auxiliary transportation problem for the first and the second windows using second flows from the first subset of the objects in the first window to the first subset of the targets in the second window.

7. The method of claim 6 further comprising:
shifting the first window to comprise a second subset of the objects in the second level;
shifting the second window to comprise a second subset of the targets in the second level; and
solving the auxiliary transportation problem for the shifted first window and the shifted second window using third flows from the second subset of the objects in the shifted first window to the second subset of the targets in the shifted second window.

8. The method of claim 1, wherein generating the first flows from the objects in the second level to the targets in the second level further comprises:
moving at least a subset of the objects to at least a subset of the targets based on a sum of displacements of the objects moved from positions in an input placement to different positions in the output placement.

9. The method of claim 1 further comprising:
generating additional clusters of objects in additional levels of the pyramid in each of the objects in a next higher level of the pyramid;
generating additional clusters of targets in the additional levels in each of the targets in the next higher level of the pyramid; and
generating second flows from objects in a third level of the pyramid to targets in a level of the pyramid higher than the third level using third flows computed in the level of the pyramid higher than the third level for the output placement of the circuit blocks.

10. A non-transitory computer-readable storage medium comprising instructions stored thereon for causing a computer to execute a method of using an integrated circuit placement tool to place a circuit design for an integrated circuit, the method comprising:
generating a graph comprising first flows between objects in a first level of a pyramid and targets in the first level of the pyramid;
generating clusters of objects in a second level of the pyramid in each of the objects in the first level, wherein the second level is different than the first level;
generating clusters of targets in the second level of the pyramid in each of the targets in the first level, wherein the objects in the first and the second levels comprise circuit blocks in the circuit design, and wherein the targets in the first and the second levels comprise subregions of the integrated circuit; and
generating second flows from the objects in the second level to the targets in the second level for a placement of the circuit blocks that satisfies at least one area constraint of the integrated circuit.

11. The non-transitory computer-readable storage medium of claim 10, wherein generating the clusters of the objects in the second level of the pyramid comprises causing each of the objects in the first level to have the objects in the second level that are close in the circuit design, and wherein generating the clusters of the targets in the second level of the pyramid comprises causing each of the targets in the first level to have geometrically close ones of the subregions of the integrated circuit corresponding to the clusters of the targets in the second level.

12. The non-transitory computer-readable storage medium of claim 10, wherein the first level of the pyramid corresponds to a transportation problem, wherein the second level of the pyramid corresponds to small dimensional transportation problems, and wherein the second flows correspond to a solution of the transportation problem.

13. The non-transitory computer-readable storage medium of claim 10, wherein generating the second flows from the objects in the second level to the targets in the second level further comprises:
formulating auxiliary transportation problems for each of the clusters of the objects in the second level of the pyramid; and
generating solutions to the auxiliary transportation problems by generating third flows from the objects in the second level to the targets in the first level.

14. The non-transitory computer-readable storage medium of claim 10 further comprising:
generating a first window comprising a first subset of the objects in the second level;
generating a second window comprising a first subset of the targets in the second level; and
solving an auxiliary transportation problem for the first and the second windows using third flows from the first subset of the objects in the first window to the first subset of the targets in the second window.

15. The non-transitory computer-readable storage medium of claim 14, further comprising:
shifting the first window to comprise a second subset of the objects in the second level;
shifting the second window to comprise a second subset of the targets in the second level; and
solving the auxiliary transportation problem for the shifted first window and the shifted second window using fourth flows from the second subset of the objects in the shifted first window to the second subset of the targets in the shifted second window.

16. A circuit design system configured to generate a circuit design for an integrated circuit, the circuit design system comprising:
a placement tool configured to generate a graph comprising first flows between objects in a first level of a pyramid and targets in the first level of the pyramid,
wherein the placement tool generates clusters of objects in a second level of the pyramid in each of the objects in the first level, wherein the second level is different than the first level, wherein the objects in the first and the second levels comprise circuit blocks in the circuit design,
wherein the placement tool generates clusters of targets in the second level of the pyramid in each of the targets in the first level, wherein the targets in the first and the second levels comprise subregions of the integrated circuit, and
wherein the placement tool generates second flows from the objects in the second level to the targets in the second level for a placement of the circuit blocks that satisfies at least one constraint of the integrated circuit.

17. The circuit design system of claim 16, wherein the placement tool causes each of the objects in the first level to have the clusters of the objects in the second level that are close in the circuit design, and wherein the placement tool causes each of the targets in the first level to have geometrically close ones of the subregions of the integrated circuit corresponding to the clusters of the targets in the second level.

18. The circuit design system of claim 16, wherein the first level of the pyramid corresponds to a transportation problem, wherein the second level of the pyramid corresponds to small dimensional transportation problems, and wherein the second flows from the objects in the second level to the targets in the second level correspond to a solution of the transportation problem.

19. The circuit design system of claim 16, wherein the placement tool formulates auxiliary transportation problems for each of the clusters of the objects in the second level of the pyramid and generates solutions to the auxiliary transportation problems by generating third flows from the objects in the second level to the targets in the first level.

20. The circuit design system of claim 16, wherein the placement tool generates a first window comprising a subset of the objects in the second level and a second window comprising a subset of the targets in the second level, and wherein the placement tool solves an auxiliary transportation problem for the first and the second windows using third flows from the subset of the objects in the first window to the subset of the targets in the second window.

* * * * *